US010907632B2

(12) United States Patent
Morreale et al.

(10) Patent No.: US 10,907,632 B2
(45) Date of Patent: Feb. 2, 2021

(54) VALVE STOP RETAINER DEVICE

(71) Applicant: FMC TECHNOLOGIES, INC., Houston, TX (US)

(72) Inventors: John D. Morreale, Houston, TX (US); Jason Smith, Porter, TX (US)

(73) Assignee: FMC Technologies, Inc., Houston, TX (US)

( * ) Notice: Subject to any disclaimer, the term of this patent is extended or adjusted under 35 U.S.C. 154(b) by 784 days.

(21) Appl. No.: 15/324,041

(22) PCT Filed: Jul. 11, 2014

(86) PCT No.: PCT/US2014/046390
§ 371 (c)(1),
(2) Date: Jan. 5, 2017

(87) PCT Pub. No.: WO2016/007174
PCT Pub. Date: Jan. 14, 2016

(65) Prior Publication Data
US 2017/0159655 A1 Jun. 8, 2017

(51) Int. Cl.
F04B 53/10 (2006.01)
F04B 53/22 (2006.01)
(Continued)

(52) U.S. Cl.
CPC ............ F04B 53/22 (2013.01); F04B 1/0452 (2013.01); F04B 19/22 (2013.01); F04B 53/007 (2013.01);
(Continued)

(58) Field of Classification Search
CPC .... F04B 53/1032; F04B 53/007; F04B 53/16; F04B 43/162; F04B 53/164; F04B 53/22

USPC ......................................................... 417/454
See application file for complete search history.

(56) References Cited

U.S. PATENT DOCUMENTS 3,937,249 A * 2/1976 Suey ..................... F16K 15/063
137/543.13
5,358,038 A * 10/1994 Edwards .................. F04F 1/08
166/105
(Continued)

FOREIGN PATENT DOCUMENTS

GB 2416811 A 2/2006

OTHER PUBLICATIONS

International Search Report and Written Opinion dated Dec. 3, 2014 for PCT/US2014/046390 filed on Jul. 11, 2014.
(Continued)

Primary Examiner — Patrick Hamo
(74) Attorney, Agent, or Firm — Osha Bergman Watanabe & Burton LLP

(57) ABSTRACT

A valve stop retainer device (220) that is adapted to interface with a cross-bore fluid communication chamber (262) of a reciprocating pump (250) includes a spring retainer plate (221) and a plurality of retainer lobes (223) extending substantially away from a first side of the spring retainer plate (221). Each of the plurality of retainer lobes (223) includes an upper portion (223u) having an outer surface (223s). A shape of each of the outer surfaces (223s) and a shape of an inside surface (261) of the cross-bore fluid communication chamber (262) interfacing with the valve stop retainer device (220) substantially conform to a shape of at least a portion of a surface of revolution. The valve stop retainer device (220) is adapted to be retained inside of the cross-bore fluid communication chamber (262) by the shape of the inside surface (261).

20 Claims, 14 Drawing Sheets

(51) Int. Cl.
*F16K 27/02* (2006.01)
*F16K 15/18* (2006.01)
*F04B 1/0452* (2020.01)
*F04B 53/00* (2006.01)
*F04B 19/22* (2006.01)
*F04B 53/14* (2006.01)

(52) U.S. Cl.
CPC ...... *F04B 53/1025* (2013.01); *F04B 53/1032* (2013.01); *F04B 53/1035* (2013.01); *F04B 53/1087* (2013.01); *F04B 53/14* (2013.01); *F16K 15/18* (2013.01); *F16K 27/0209* (2013.01)

(56) References Cited

U.S. PATENT DOCUMENTS

| | | | |
|---|---|---|---|
| 6,623,259 | B1 | 9/2003 | Blume |
| 7,681,589 | B2 * | 3/2010 | Schwegman ......... F16K 15/063 137/15.17 |
| 8,506,262 | B2 * | 8/2013 | Leugemors ......... F04B 53/1025 417/298 |
| 8,915,722 | B1 * | 12/2014 | Blume .................. F04B 53/007 137/543.23 |
| 9,732,746 | B2 * | 8/2017 | Chandrasekaran ... F04B 53/007 |
| 2009/0142199 | A1 | 6/2009 | Blanco |
| 2011/0206547 | A1 | 8/2011 | Kim et al. |
| 2012/0288387 | A1 * | 11/2012 | Freed ..................... F04B 53/10 417/454 |
| 2013/0263932 | A1 | 10/2013 | Baxter et al. |

OTHER PUBLICATIONS

Russian Official Action dated Feb. 8, 2018 for Russian Patent Application No. 2017104429 filed on Jul. 11, 2014 (PCT Effective Filing Date).
Chinese First Official Action dated Jun. 25, 2018, for Chinese patent application No. 201480081398.4, filed on Feb. 22, 2017.

* cited by examiner

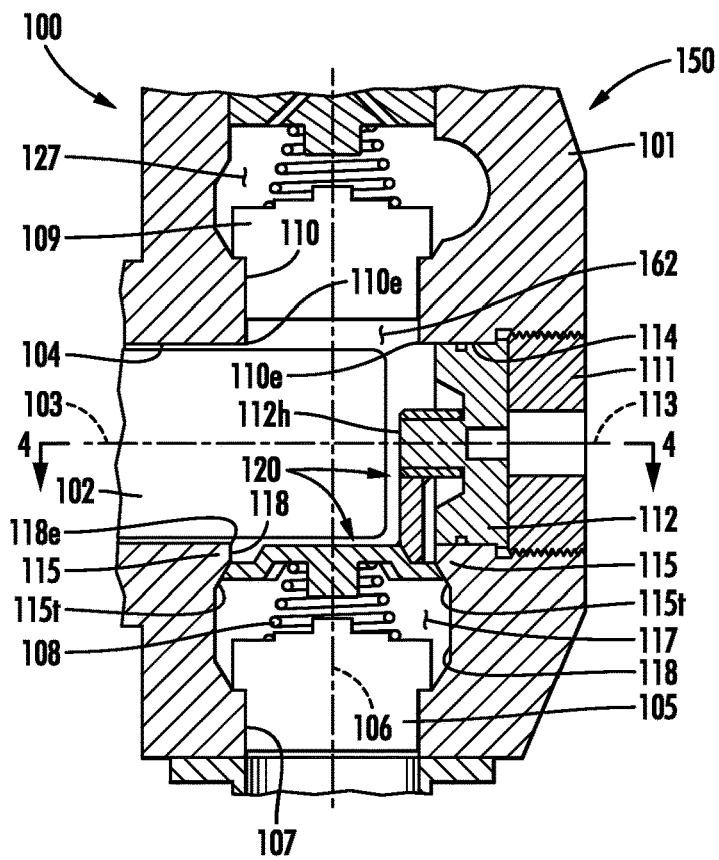
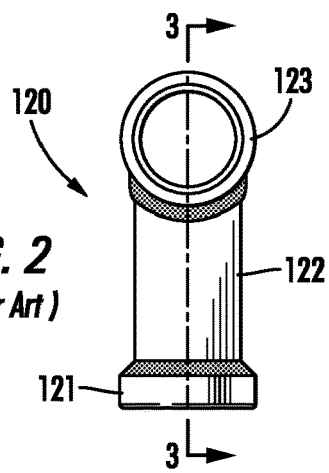
FIG. 2 (Prior Art)
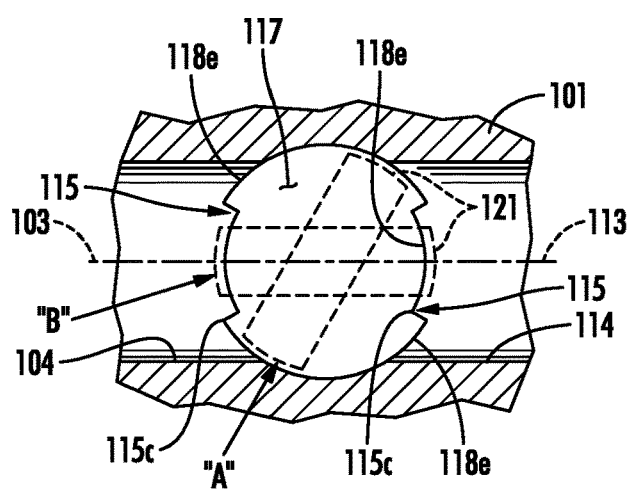
FIG. 4 (Prior Art)
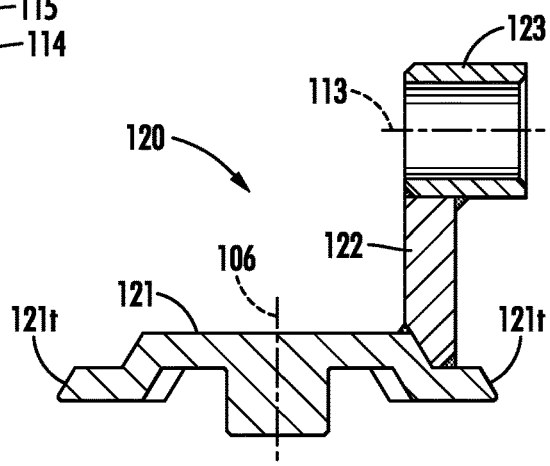
FIG. 3 (Prior Art)

VALVE STOP RETAINER DEVICE

BACKGROUND

1. Field of the Disclosure

The present disclosure is generally directed to reciprocating plunger and piston-type pumps, and in particular, to valve stop retainer devices that may be used in such pumps.

2. Description of the Related Art

Plunger pumps generally include a plunger that is positioned in a plunger bore, a suction valve that is positioned in a suction bore, and a discharge valve that is positioned in a discharge bore. During operation, the plunger is reciprocated within the plunger bore to alternately draw fluid into the pump through the suction valve and then force the fluid out of the pump through the discharge valve. Typically, a valve stop retainer is used to maintain the suction valve in place within the suction bore during pump operation, without which the suction valve and/or its corresponding parts would be free to rise into the path of the plunger, thereby resulting in damage to the plunger or other parts of the pump. In larger sized plunger pumps, such as those that are typically used in the oilfield industry, the valve stop retainer is often a removable component that is installed or removed separately from the suction valve, thus allowing pump inspection and/or maintenance activities to be performed.

Various means are used to mount a valve stop retainer within the suction bore and/or the pump chamber of a reciprocating plunger pump. For example, FIGS. 1-4 depict one illustrative valve stop retainer that is used in some prior art applications. FIG. 1 is a partial cross-sectional view of the fluid end 100 of an exemplary prior art reciprocating plunger pump 150, where the section view is taken through a plunger bore 104 and pump chamber 162 of the pump fluid end 100. A plunger 102 is positioned in the plunger bore 104, which is formed in a pump housing 101, and the plunger 102 reciprocates within the plunger bore 104 along a plunger axis 103. A suction valve 105 is positioned in a suction bore 107 and a discharge valve 109 is positioned in a discharge bore 110. A valve stop retainer 120 is positioned generally between the suction valve 105 and the plunger 102/plunger bore 104, and is used to retain the suction valve 105 in its position within the suction bore 107. The suction bore 107 has an axis 106 and the discharge bore 110 has an axis 116 that, in some cases, is coaxially aligned with the axis 106. Additionally, the suction valve 105 actuates along the axis 106 and the discharge valve actuates along the axis 116. An access plug 112 and threaded cover plate 111 are positioned in an access opening 114, both of which are removable so as to provide access to the interior of the pump chamber 162 for inspection and/or maintenance activities. The access opening 114 has an opening axis 113 that is coaxially aligned with the plunger axis 103.

During operation of the reciprocating plunger pump 150, the plunger 102 moves out of and/or away from the pump chamber 162 along the plunger axis 103, which causes the pressure of the fluid inside pump chamber 162 to decrease. This decrease in fluid pressure within the pump chamber 162 creates a differential pressure across the suction valve 105, which, when high enough, causes the suction valve 105 to actuate to its open position, thus allowing fluid to enter a suction port 117 and the pump chamber 162 from a fluid inlet (not shown) upstream of the suction valve 105. The fluid enters the pump chamber 162 as the plunger 102 continues to move away from the chamber 162 along the plunger axis 103 until the pressure differential between the chamber 162 and the fluid inlet (not shown) is low enough for the suction valve 105 to actuate to its closed position. After the plunger 102 reverses direction (reciprocates) within the plunger bore 104, it moves back towards and/or into the pump chamber 162, thus causing the pressure on the fluid inside of the pump chamber 162 to increase. Fluid pressure inside of the pump chamber 162 continues to increase as the plunger 102 moves closer to the pump chamber 162 until the differential pressure across the discharge valve 109 is great enough to actuate the discharge valve 109 to its open position and allow the fluid to exit the pump chamber 162 to a discharge port 127 and from there to a fluid outlet (not shown) downstream of the discharge valve 109.

FIG. 2 is an end view of the valve stop retainer 120 and FIG. 3 is cross-sectional view of the valve stop retainer 120 taken along the section line "3-3" in FIG. 2. The valve stop retainer 120 includes a spring retainer plate 121 that retains the suction valve spring 108 relative to the suction port 117. The spring retainer plate 121 has tapered end surfaces 121*t* that contact and engage with a pair of diametrically opposed flanged lips or protrusions 115, which are positioned at the upper end of the suction port 117, along correspondingly tapered surfaces 115*t*.

FIG. 4, which is a partial view of the suction port 117 when viewed from above along the view line "4-4" shown in FIG. 1, depicts how the valve stop retainer 120 is positioned inside of the suction port 117 so that the tapered ends 121*t* contact and engage with the tapered surfaces 115*t* of the diametrically opposed protrusions 115. For clarity, all internal components of the pump fluid end 100 (e.g., plunger 102, suction valve 105, access plug 112, threaded cover plate 111, etc.) have been removed from FIG. 4, and only the outline of the spring retainer plate 121 of the valve stop retainer 120 has been shown in dashed lines. The valve stop retainer 120 is installed into the pump fluid end 100 through the access opening 114 before the access plug 112 and threaded cover plate 111 are installed. As shown in FIG. 4, the valve stop retainer 120 is oriented in Position "A" such that the tapered ends 121*t* of the spring retainer plate 121 are positioned above the open spaces between the two protrusions 115. The valve stop retainer 120 is then lowered into the suction port 117 and the suction valve spring 108 is sufficiently compressed by the spring retainer plate 121 so that the tapered ends 121*t* of the spring retainer plate 121 are below the level of the tapered surfaces 115*t* of the corresponding protrusions 115. The valve stop retainer 120 is then rotated to Position "B" so that the tapered ends 121*t* of the spring retainer plate 121 are oriented below the corresponding protrusions 115. The spring 108 then biases the valve stop retainer 120 upward until the taper surfaces 121*t* contact and engage with the tapered surfaces 115*t*.

As shown in FIGS. 1 and 3, the valve stop retainer device 120 has a column or bar 122 attached to one end, and a bushing 123 is attached to the upper end of the bar 122. When the valve stop retainer 120 is installed into the suction port 117 as described above and illustrated in FIGS. 1 and 4, the centerline of the bushing 123 is coaxially aligned with the opening axis 113 and the centerline of the valve stop retainer 120 is coaxially aligned with the axis 106. The access plug 112 is then installed into the access bore 114 so that a cylindrical hub 112*h* protruding from the center of the plug 112 is inserted into the coaxially aligned bushing 123. In this way, the bar 122, bushing 123, and hub 112*h* act together as an anti-rotation device, thus preventing the spring retainer plate 121 from rotating during pump operation, and ensuring that the tapered ends 121t remain below and in contacting engagement with the tapered surfaces 115t of the protrusions 115 so that the suction valve 105 is retained in the suction bore 107.

In many oilfield pumping applications, such as during water injection and/or formation fracturing operations, reciprocating plunger pumps are often called upon to deliver fluid discharge pressures in the range of approximately 70-100 MPa (10-15,000 psi) or even higher. Due to the operational characteristics of reciprocating pumps in general, the fluid end of the pump is subjected to high frequency cyclic pressure loading. In some extreme service pumps, such as those used for the high pressure oilfield applications noted above, very high stress intensities are frequently created along the inside surfaces of the pump. This is particularly the case in high stress concentration areas that occur at or near structural discontinuities in the pump geometry, such as the edges of intersecting bores and the like. In the case of the pump fluid end 100 shown in FIGS. 1 and 4, such high stress concentration areas would include the edges 118e formed at the intersections of the plunger bore 104 and/or the access bore 114 with the bore 118 of the suction port 117, and the edges 109e formed at the intersections of the plunger and access bores 104 and 114 with the discharge bore 110. Other structural discontinuities where high stress concentrations are often present would be the corners of any internal notches, grooves, flanged lips, and/or protruding elements that are used to support and/or positionally locate the pump internal components. For example, in the pump fluid 100 depicted FIGS. 1 and 4, such locations would include the corners 115c of the protrusions 115 that are used to position and retain the valve stop retainer 120 inside of the suction port 117.

Under the high magnitude cyclic stresses that are inherent in the high pressure pulsation loading of extreme service reciprocating plunger pumps, fatigue cracks will often develop in the fluid end of the pump in and around the areas of high stress concentration described above. Depending on the nature and extent of such fatigue cracking, it is often necessary to remove the fluid end of a high pressure reciprocating pump from service so that the fatigue cracks can be repaired, and/or so the pump can be replaced. In an effort to reduce the degree of stress concentrations in these areas and to reduce the amount of pump downtime caused repair and/or replacement, the edges that are formed at the intersections of the various pump bores in some prior art pumps, such as the edges 118e and/or 110e of the pump fluid end 100, are often dressed by grinding or machining to have radiused or chamfered configurations. Similarly, the corners at internal notches, grooves, and or protrusions, such as the corners 115c of the protrusions 115, are often radiused and/or chamfered, or the geometry of the protrusions is adjusted so as to more gradually blend into the surfaces from which they protrude. Although these edge/corner dressing and/or blending approaches can serve to incrementally reduce such high stress concentrations, these areas remain prone to fatigue cracking under the cyclic loading and high stress intensities generated by extreme service reciprocating pumps.

The present disclosure is directed to various new methods, devices, and pump element configurations, including novel valve stop retainer device configurations, that may serve to mitigate at least some of the above-described problems associated with high stress concentration areas of prior art reciprocating pumps.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

The present disclosure is generally directed to various methods, devices, and pump element configurations may act to reduce the high stress concentration effects associated with the internal geometrical configuration reciprocating pumps. In one illustrative embodiment, valve stop retainer device that is adapted to interface with a cross-bore fluid communication chamber of a reciprocating pump is disclosed. The valve stop retainer device includes, among other things, a spring retainer plate and a plurality of retainer lobes extending substantially away from a first side of the spring retainer plate. Additionally, each of the plurality of retainer lobes includes an upper portion having an outer surface, wherein the shape of each of the outer surfaces and a shape of an inside surface of the cross-bore fluid communication chamber interfacing with the valve stop retainer device substantially conform to a shape of at least a portion of a surface of revolution. Furthermore, the disclosed valve stop retainer device is adapted to be retained inside of the cross-bore fluid communication chamber by the shape of the inside surface.

In another illustrative embodiment, a fluid end assembly of a reciprocating pump is disclosed that includes, among things, a pump housing and a cross-bore fluid communication chamber positioned in the pump housing, wherein the cross-bore fluid communication chamber has an inside surface and the shape of the inside surface substantially conforms to a shape of a boundary defined by a surface of revolution having an axis of revolution. The exemplary fluid end assembly further includes a suction bore positioned in the pump housing, a suction valve positioned in the suction bore, and a valve stop retainer device positioned in the cross-bore fluid communication chamber and includes a plurality of retainer lobes having outer surface portions. The valve stop retainer device is adapted to be rotated about the axis of revolution while positioned inside of the cross-bore fluid communication chamber and is adapted to retain the suction valve in the suction bore during operation of said reciprocating pump. Furthermore, the shape of each of the outer surface portions substantially conforms to the shape of the boundary of the surface of revolution.

BRIEF DESCRIPTION OF THE DRAWINGS

The disclosure may be understood by reference to the following description taken in conjunction with the accompanying drawings, in which like reference numerals identify like elements, and in which:

FIG. 1 is a partial cross-sectional view of the fluid end of an illustrative prior art reciprocating plunger pump;

FIG. 2 is an end view of an exemplary prior art valve stop retainer used in the prior art reciprocating plunger pump of FIG. 1;

FIG. 3 is cross-sectional view of the prior art valve stop retainer shown in FIG. 2 taken along the section line "3-3";

FIG. 4 is a partial view of the suction port and prior art valve stop retainer of the prior art reciprocating plunger pump depicted in FIG. 1 when viewed from above along the view line "4-4" of FIG. 1;

FIG. 11A is a close-up detailed view of the interface between the inside surface of the cross-bore fluid communicating chamber and the outer surfaces of the valve stop retainer device;

Figure 5:
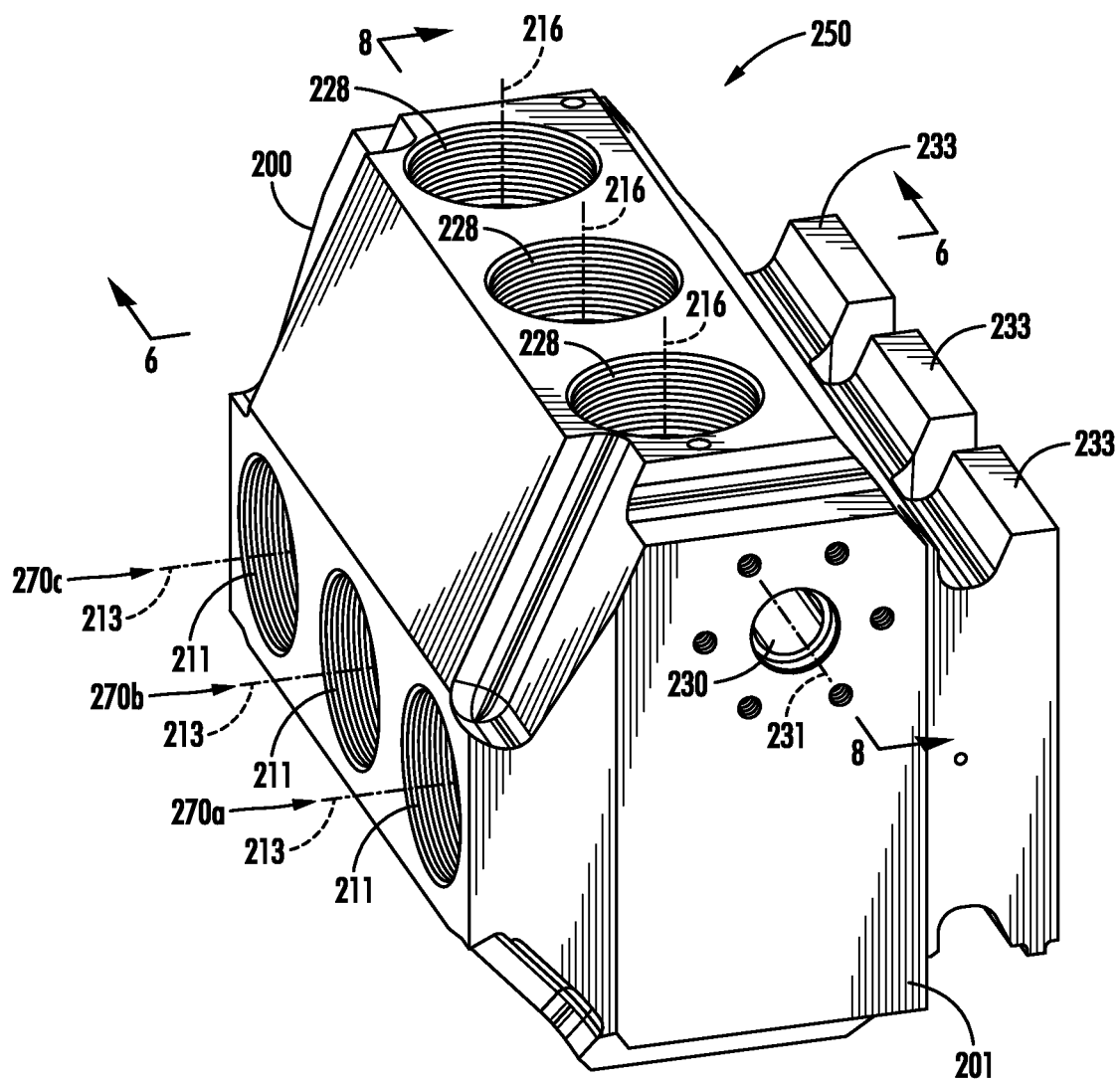
FIG. 5 is an isometric view of an illustrative fluid end of a reciprocating plunger pump in accordance with one embodiment of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In the following detailed description, various details may be set forth in order to provide a thorough understanding of the various exemplary embodiments disclosed herein. However, it will be clear to one skilled in the art that some illustrative embodiments of the inventions defined by the appended claims may be practiced without some or all of these such various disclosed details. Furthermore, features and/or processes that are well-known in the art may not be described in full detail so as not to unnecessarily obscure the disclosed subject matter. In addition, like or identical reference numerals may be used to identify common or similar elements.

FIG. 5 is an isometric view illustrating the fluid end assembly 200 of an exemplary embodiment of a reciprocating plunger pump 250. As shown in FIG. 5, the pump fluid end 200 may include a pump housing 201 having a plurality of mounting flanges 233 that are used to mount the fluid end 200 to a corresponding power end (not shown) that is used to drive the pump 250. In some embodiments, the pump fluid end 200 may include a plurality of plunger sections 270a, 270b, 270c, and while three plunger sections are shown in FIG. 5, the total number of plunger sections may vary, e.g. from one plunger section to five plunger sections or even more, depending on the overall design parameters of the reciprocating pump 250.

Figure 6:
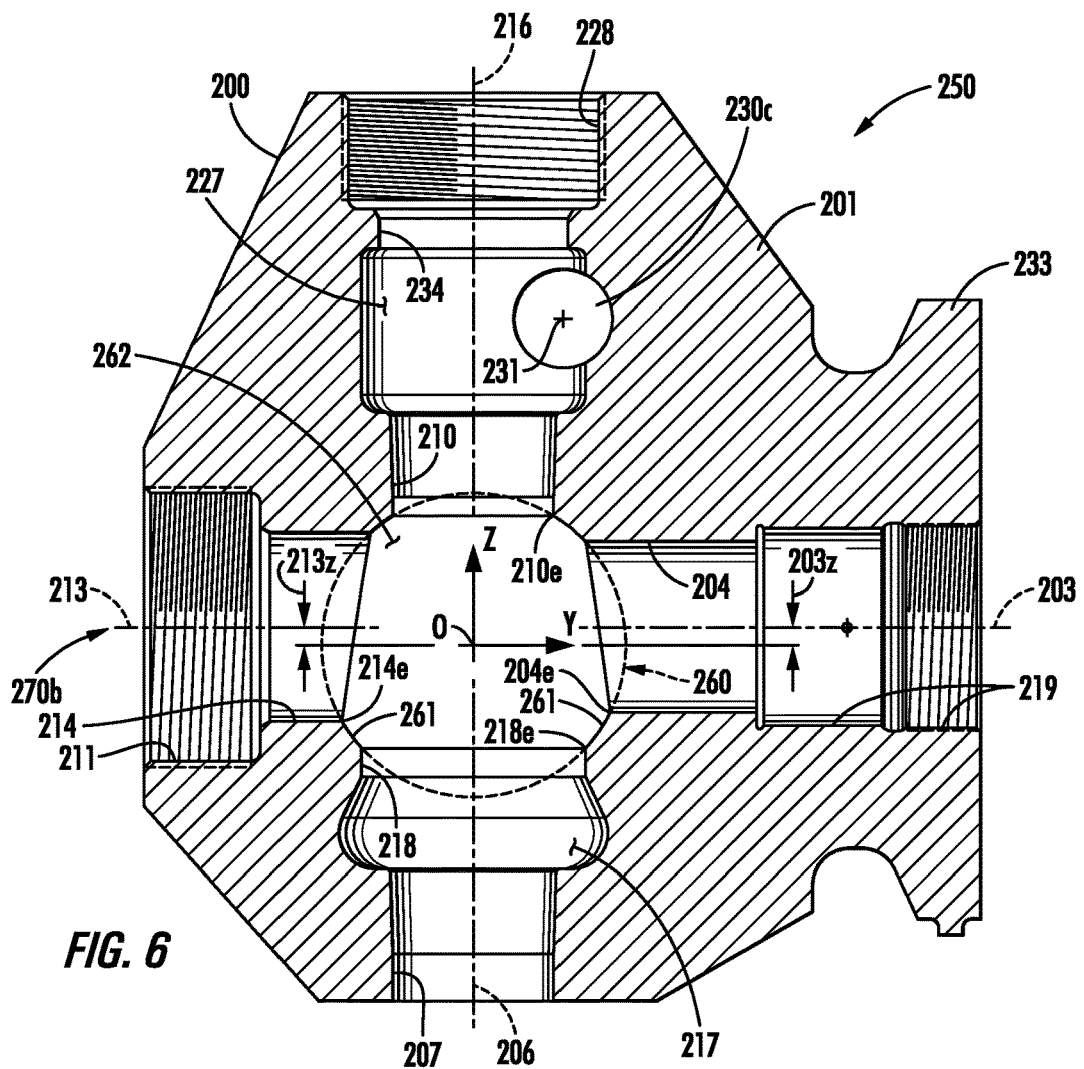
FIG. 6 is a cross-sectional view through one plunger section of the exemplary pump fluid end depicted in FIG. 5 when viewed along the section line "6-6" of FIG. 5.
Figure 7:
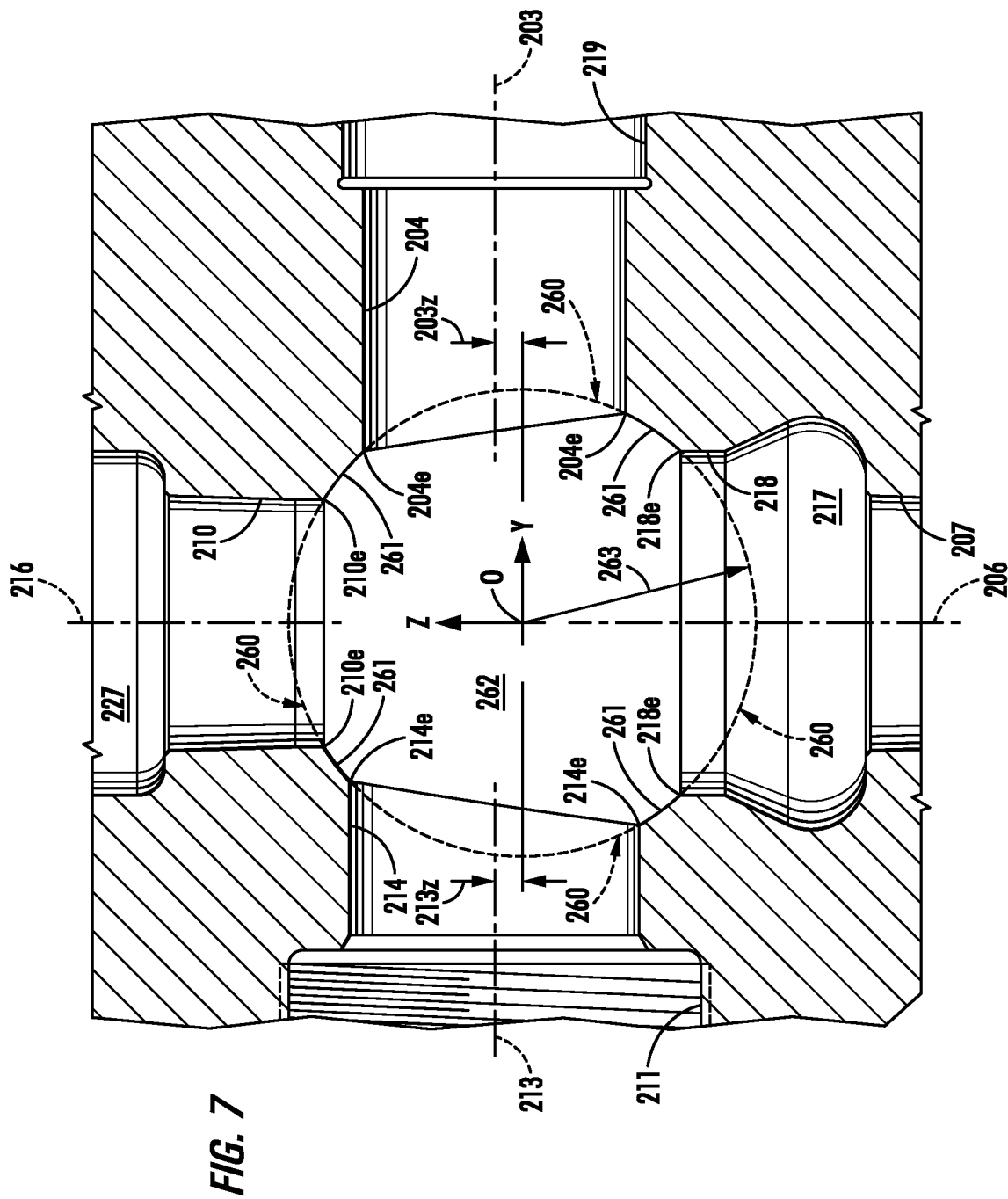
FIG. 7 is a close-up cross-sectional view of a cross-bore fluid communicating chamber depicted in FIG. 6.
Figure 8:
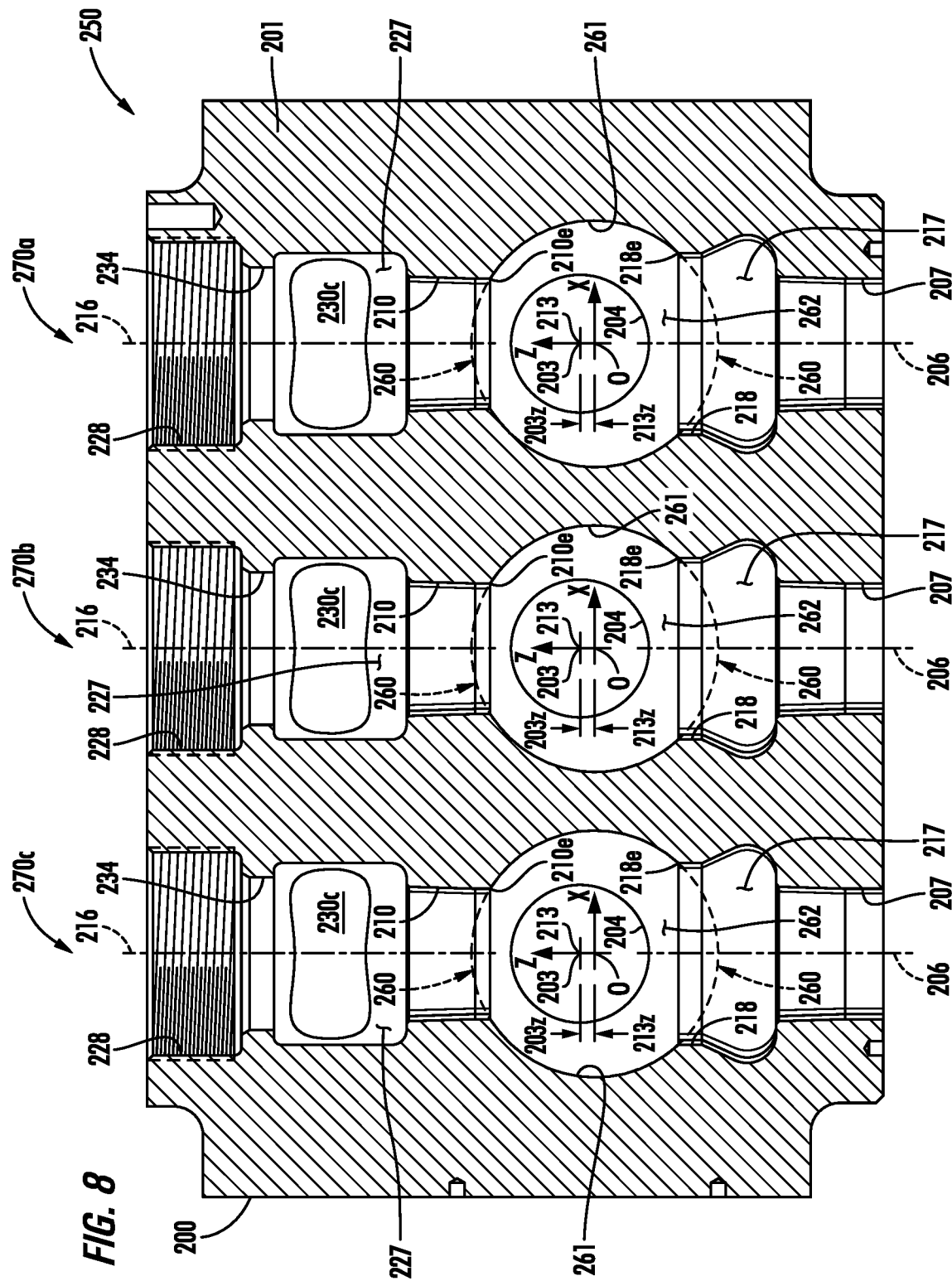
FIG. 8 is a cross-sectional view through each of the cross-bore fluid communicating chambers of the illustrative pump fluid end depicted in FIG. 5 when viewed along the section line "8-8" of FIG. 5.

FIG. 6 is a cross-sectional view through one plunger section, i.e. the center plunger section 270b, of the pump fluid end 200 when viewed along the section line "6-6" of FIG. 5. Further detail of the cross-bore fluid communicating chamber 262 is shown in FIG. 7, which is a close-up view of the cross-bore chamber 262 shown in FIG. 6. In some embodiments, each of the plunger sections 270a-c (and any additional plunger sections more than the three plunger sections shown in FIG. 5) may be configured in substantially similar fashion. Accordingly, it should be understood that any description of the plunger section 270b set forth below may be similarly applicable to any other plunger section included in any of the reciprocating plunger pumps 250 disclosed herein. Additionally, FIG. 8 is a cross-sectional view through each of the cross-bore fluid communicating chambers 262 of the pump fluid end 200 when viewed along the section line "9-9" of FIG. 5. For clarity, the various internal elements of the pump fluid end 200 are not illustrated in FIGS. 5-8, but are instead illustrated in FIGS. 10 and 11 and will be described in further detail below.

In general, the cross-bore fluid communicating chamber 262 is adapted to receive a flow of fluid passing into the plunger section 270b through a suction bore 207 and to discharge the flow of fluid into a discharge bore 210 during operation of the reciprocating plunger pump 205. As shown in FIGS. 6-8, the plunger section 270b (and any other similar plunger sections of the pump fluid end 200) may include a plurality of bores that intersect at the cross-bore fluid communicating chamber 262. For example, in some embodiments, the plunger section 270b may include a plunger bore 204 that intersects the cross-bore fluid communicating chamber 262, where edge 204e is formed. Furthermore, the plunger bore 204 may pass through the housing 201 of the pump fluid end 200 along a plunger axis 203, and is adapted to receive a reciprocating plunger 202 (not shown; see FIGS. 10 and 11). As shown in FIGS. 6 and 7, the plunger bore 204 may extend between the cross-bore fluid communicating chamber 262 and a counterbore 219 that is coaxially aligned with the plunger axis 203. In some embodiments, the counterbore 219 may be adapted to receive a stuffing box 232 (not shown), as will be further described in conjunction with FIG. 10 below.

As noted previously, the plunger section 270b may also include a discharge bore 210 that is adapted to house a discharge valve 209 (not shown; see FIGS. 10 and 11), and which intersects the cross-bore fluid communicating chamber 262 and forms and edge 210e. As shown in FIGS. 6 and 8, the discharge bore 210 passes through the pump housing 201 and may be positioned between the cross-bore fluid communicating chamber 262 and a discharge port 227, which adapted to receive fluid exiting the cross-bore chamber 262 through the discharge valve 209. In certain embodiments, the discharge port 227 of the plunger section 270b may be in fluid communication with each of the other discharge ports 270a/c (and any other discharge ports of the pump fluid end 200) as well as a pump outlet 230 (see, FIG. 5) by way of a lateral communicating bore 230c that passes through the pump hosing 201 along an outlet axis 231. The plunger section 270b may also include a top access opening 228 that is adapted to receive a top access plug 229 (not shown) as will be further described in conjunction with FIGS. 10 and 11 below. Also as shown in FIGS. 6 and 8, a top access bore 234 may be positioned between the top access opening 228 and the discharge port 227. In at least some illustrative embodiments, the discharge bore 210 may be coaxially aligned with one, some, or all of the discharge port 227, the top access opening 228, and/or the top access bore 234 along a common discharge side axis 216.

As depicted in FIGS. 6-8, a communicating bore 218 may also intersect the cross-bore fluid communicating chamber 262, thus forming an edge 218e along the intersection of the bore 218 and the cross-bore chamber 262. The communicating bore 218 may be adapted to provide fluid communication between the cross-bore fluid communicating chamber 262 and a suction port 217, which may in turn be adapted to receive the fluid that is entering the plunger section 270b through a suction valve 205 (not shown; see FIGS. 10 and 11) that as adapted to be positioned in the suction bore 207. Furthermore, in at least some embodiments of the pump configurations disclosed herein, the communicating bore 218 may be considered as an extension of the suction port 217, i.e., such that the suction port 217 intersects the cross-bore fluid communication chamber 262. Therefore, for purposes of the present discussion, references made to the communicating chamber 218 may be considered to be equally applicable to the suction port 217, as may be appropriate for the specific suction side pump configuration in question. As shown in FIGS. 6 and 8, the suction bore 207, the suction port 217, and the communicating bore 218 may each pass through the pump housing 201, and furthermore may be coaxially aligned along a common suction side axis 206.

In at least some embodiments, the communicating bore 218, suction port 217, and suction bore 207 may be positioned on substantially the opposite side of the cross-bore fluid communicating chamber 262 from the discharge bore 210. In such embodiments, the suction side axis 206 may be coaxially aligned with the discharge side axis 216, although in at least one embodiment the suction side and discharge side axes 206 and 216 may be laterally offset, depending on the specific pump design parameters. In still other embodiments, the suction side axis 206 may be oriented at an angle relative to the discharge side axis 216, e.g., as in a Y-block plunger pump configuration and the like.

The plunger section 270b may also include a side access bore 214 that is positioned on substantially the opposite side of the cross-bore fluid communicating chamber 262 from the plunger bore 204, and may intersect the cross-bore chamber 262 so as to form an edge 214e. As shown in FIGS. 6-8, the side access bore 214 may pass through the pump housing 201 along a side axis 213, and may be positioned between the cross-bore chamber 262 and a side access opening 211 that is adapted to receive a side access plug 212 (not shown) as will be further described in conjunction with FIG. 10 below. In some embodiments, the side access opening 211 may be coaxially aligned with the side access bore 214, i.e., along the side axis 213. Furthermore, in certain exemplary embodiments, the side axis 213 may be coaxially aligned with the plunger axis 203 as shown in FIGS. 6-8, although in other embodiments the side axis 213 and plunger axis 203 may be laterally or vertically offset, or both.

As described above, the illustrative embodiments depicted in FIGS. 6-8 each show that the various individual bores 204, 210, 218, and 214 may intersect different regions of the cross-bore fluid communicating chamber 262, rather than intersecting each other—as would typically the case with the pump chamber 162 of the prior art pump fluid end 100. In this way, the stress concentrations that occur in and around the cross-bore chamber 262 at the intersecting edges 204e, 210e, 218e, and 214e may be substantially reduced relative to what would otherwise normally occur at the more sharply defined corners and edges 118e, 110e, and/or 115c in and around the pump chamber 162 of the prior art pump fluid end 100. See FIGS. 1 and 4 and the description set forth above.

As shown in FIGS. 6-8, the cross-bore fluid communicating chamber 262 may defined by a shape that substantially conforms to that of a three-dimensional shape having a boundary 260. Furthermore, and as previously noted, the boundary 260 of the three-dimensional shape defining the shape of the cross-bore chamber 262 may be configured so as to reduce and/or minimize the severity of any high stress concentration areas that would normally occur due to the typical cross-bore configurations that are often found in the fluid ends of prior art reciprocating plunger pumps (see, FIGS. 1 and 4). For example, in certain illustrative embodiments, the cross-bore fluid communicating chamber 262 may substantially conform to a shape that is configured as a three-dimensional ellipsoidal shape, such that there are substantially smooth and contiguous surface portions 261 that generally conform to the shape of the boundary 260 between and around each of the edges 204e, 210e, 218e, and 214e that are defined by the intersections of the various bores 204, 210, 218, and 214, respectively, with the cross-bore chamber 262. In other embodiments, the three dimensional shape defining the cross-bore fluid communication chamber 262 may be configured such that the boundary 260 represents any appropriately developed surface of revolution—i.e., wherein an appropriately shaped curve is rotated about a coplanar axis of revolution—provided the above-noted substantially smooth and contiguous surface portions 261 are present around each of the edges 204e, 210e, 218e, and 214e. Therefore, while at least some of the description set forth below may be directed to exemplary cross-bore chambers 262 having various different types of ellipsoidal configurations, it should be appreciated that cross-bore chamber shapes other than ellipsoids may also be used.

Figure 9:
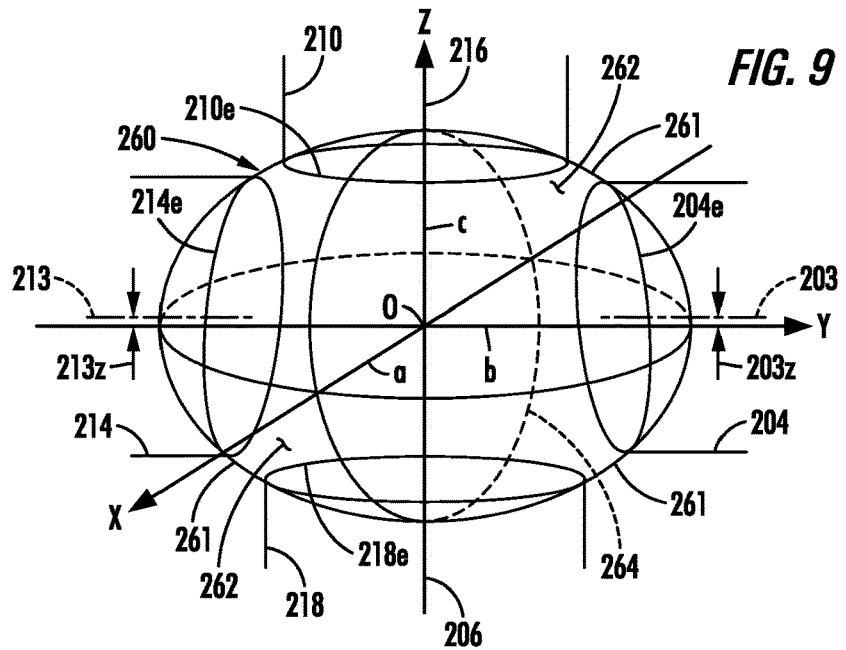
FIG. 9 is a schematic illustration of the cross-bore geometry shown in FIGS. 6-8 in accordance with one exemplary embodiment disclosed herein.

FIG. 9 schematically depicts various aspects of the geometric characteristics of an illustrative ellipsoidal shape that may be used to define the cross-bore geometry shown in FIGS. 6-8 in accordance with at least some exemplary embodiments of the present disclosure. As shown in FIG. 9, an ellipsoid that is used to define the boundary 260 of a cross-bore fluid communicating chamber 262 that is centered about the origin O of the X, Y, and Z axes may generally have any configuration that conforms to the following standard equation for an ellipsoid:

$$\frac{x^2}{a^2} + \frac{y^2}{b^2} + \frac{z^2}{c^2} = 1 \tag{1}$$

where:
a=the length of the semi-principal axis along the X-direction;
b=the length of the semi-principal axis along the Y-direction; and
c=the length of the semi-principal axis along the Z-direction.

It should be noted, however, that in order for the contiguous surface portions 261 depicted in FIGS. 6-8 to be present between and around each of the edges 204e, 210e, 218e, and 214e, the following additional conditions on the lengths of the semi-principal axes a, b, and c relative to the radiuses of the bores 204, 210, 218, and 214 may apply:
a>the radiuses of bores 204, 210, 218, and 214;
b>the radiuses of bores 210 and 218; and
c>the radiuses of bores 204 and 214.

In some illustrative embodiments, the surface 260 of the ellipsoid 262 may be rotationally generated, e.g., by rotating a two-dimensional ellipse about either one of its major or minor axes, in which case the ellipsoid 262 may sometimes be referred to either as an ellipsoid of revolution or as a spheroid. In such cases, the ellipsoid of revolution (or spheroid) 262 will have at least two semi-principal axes of the same length, whereas the third semi-principal axis may have a length that is greater than, less than, or equal to the length of the two equal semi-principal axes. For example, referring to FIG. 9, the ellipse 264 is centered about the origin O and has a minor axis length a and a major axis length c. If the ellipse 264 is rotated about the Z axis so as to form an ellipsoid of revolution (or spheroid) 262, the semi-principal axis along the X-direction will have a length a, the semi-principal axis along the Y-direction will have a length b=a, and the semi-principal axis along the Z-direction will have a length c. Depending on the size of length c relative to the lengths a and b, three different ellipsoidal shapes may result:
a=b>c results in an oblate ellipsoid of revolution, or an oblate spheroid;
a=b<c results in a prolate ellipsoid of revolution, or a prolate spheroid; and
a=b=c results in a sphere.

In the illustrative embodiments shown in FIGS. 6-8, the cross-bore fluid communicating chamber 262 is depicted as being in the shape of a sphere (i.e., the case where a=b=c) and having a spherical radius 263 (see FIG. 7). In such embodiments, the standard equation for an ellipsoid as shown in Equation 1 above reduces to the following equation for a sphere that is centered about the origin O of the X, Y, and Z axes:

$$x^2 + y^2 + z^2 = r^2 \tag{2}$$

where:
r=the radius of the sphere (e.g., radius 263 as shown in FIG. 7).

Depending on the overall design parameters of the pump fluid end 200, the origin O (or center point) of the three-dimensional shape that defines the boundary 260 may be substantially aligned with any, all, or none of the various axes 203, 206, 213, and 216 of the bores 204, 207, 214, and 210. For example, in some exemplary embodiments, the origin O of the cross-bore chamber 262 may be substantially aligned with both the suction side axis 206 and the discharge side axis 216 (as depicted in FIGS. 6-8), or it may be laterally offset from either or both axes 206 and 216 in the same or different directions. In other embodiments, the origin O may be offset vertically downward from the plunger axis 203 by a distance 203z (as shown in FIGS. 6-8), although it should be understood that the origin O may also be offset vertically upward and/or laterally from the plunger axis 203, or it may be substantially aligned with the plunger axis 203. In further embodiments, the origin O may be offset vertically downward from the side axis 213 by a distance 213z (as shown in FIGS. 6-8)—which may be the same as or different than the offset 203z. In still other embodiments, the origin O of the cross-bore chamber 262 may also be offset vertically upward from the side axis 213 and/or offset laterally from the axis 213, or the two may be substantially aligned.

Figure 10:
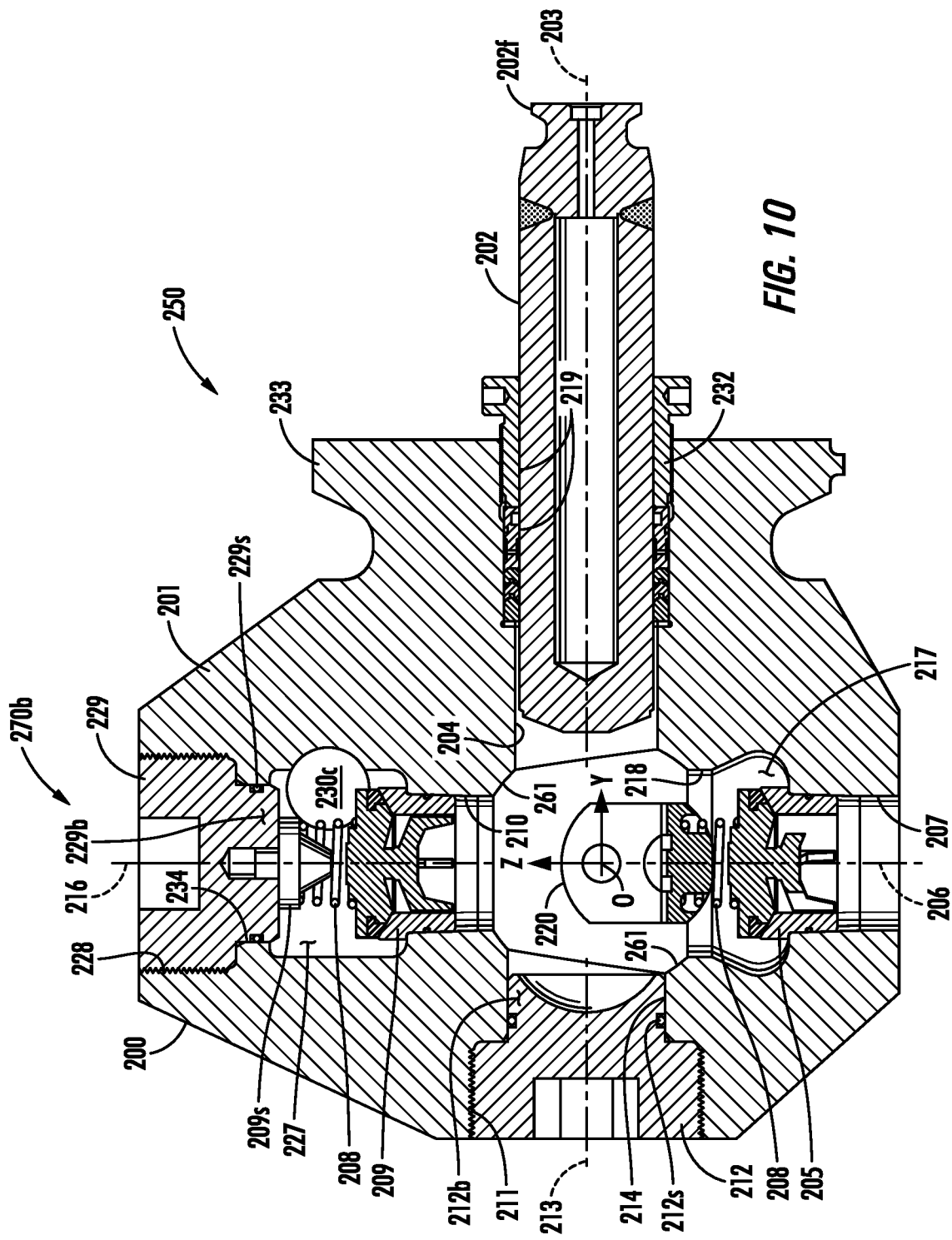
FIG. 10 is the cross-sectional view of the pump fluid end depicted in FIG. 6 after various pump components have been installed in at least the center plunger section of the pump.
Figure 11:
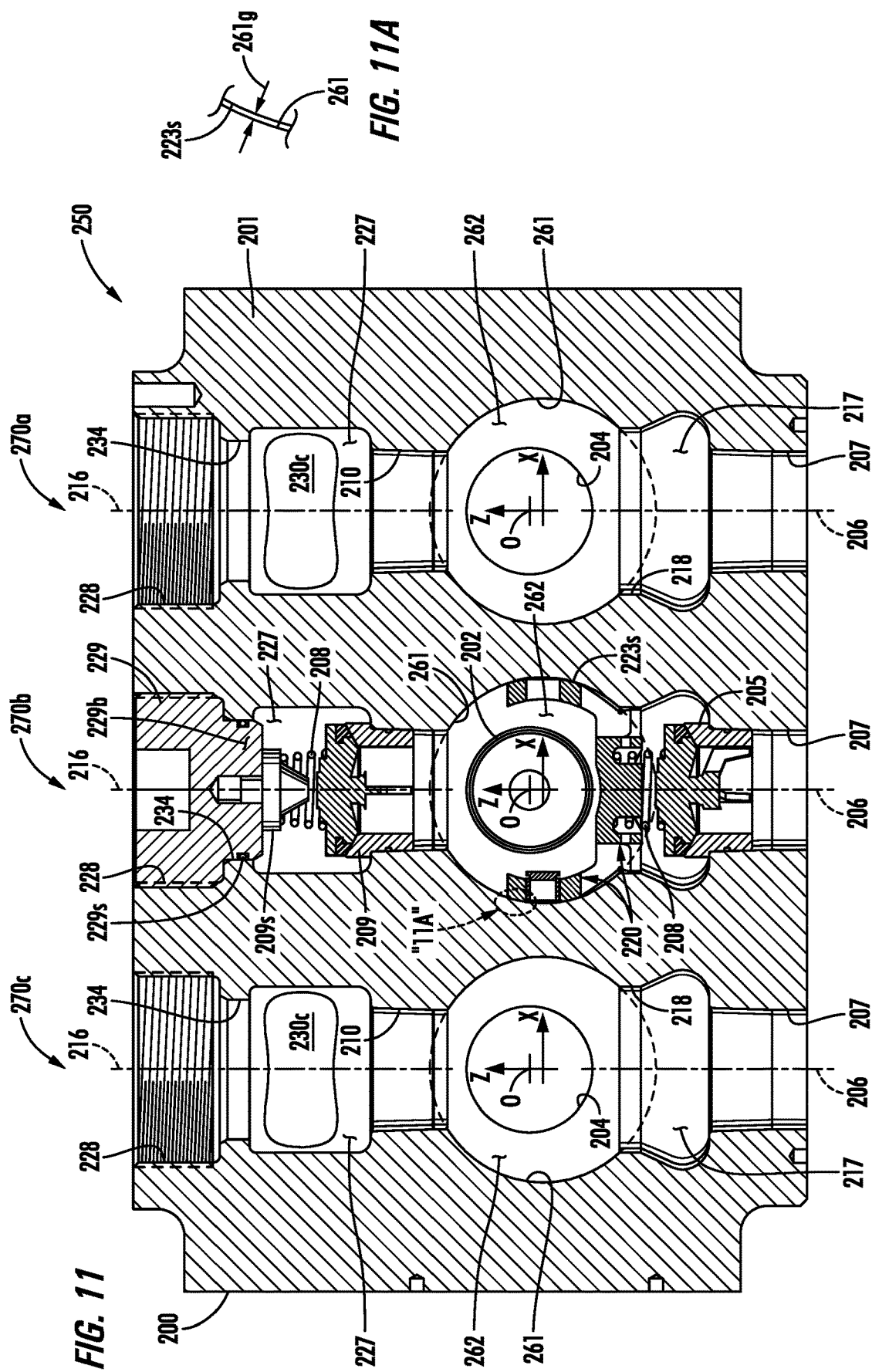
FIG. 11 is the cross-sectional view of the pump fluid end depicted in FIG. 8 after various pump components have been installed in the center plunger section of the pump.
Figure 12:
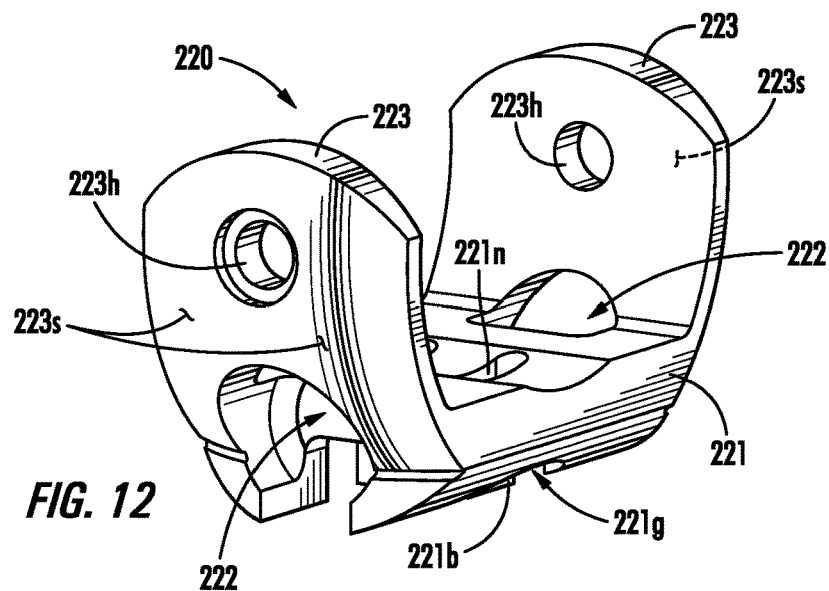
FIG. 12 is an isometric view of an exemplary valve stop retainer device in accordance with one illustrative embodiment of the present disclosure.
Figure 16:
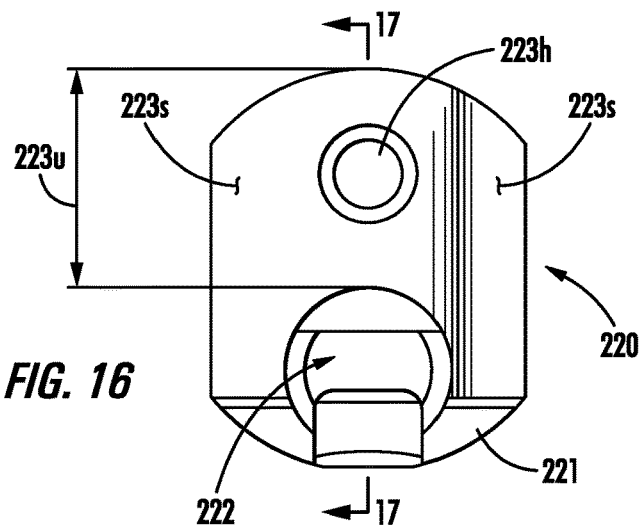
FIG. 16 is an end view of the valve stop retainer device of FIG. 12.
Figure 17:
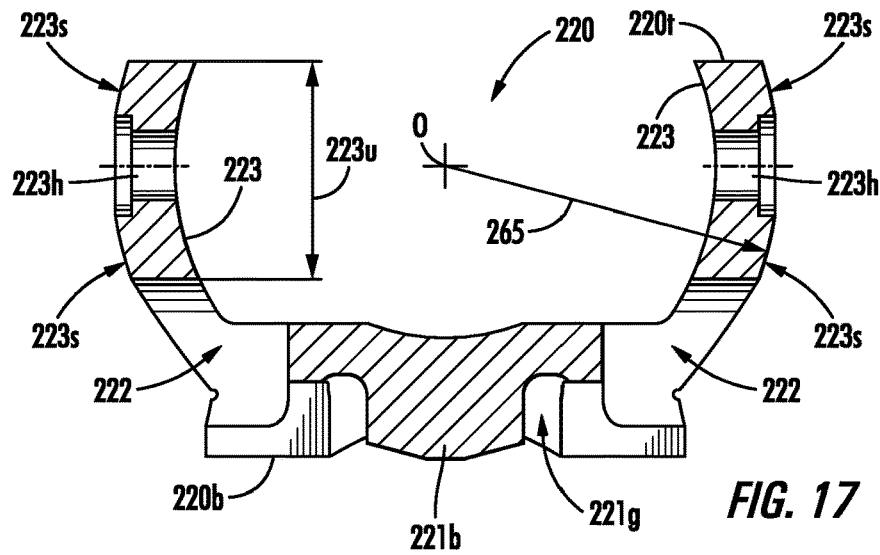
FIG. 17 is a cross-sectional view of the valve stop retainer device depicted in FIG. 12 when viewed along the section line "17-17" of FIG. 16.
Figure 13:
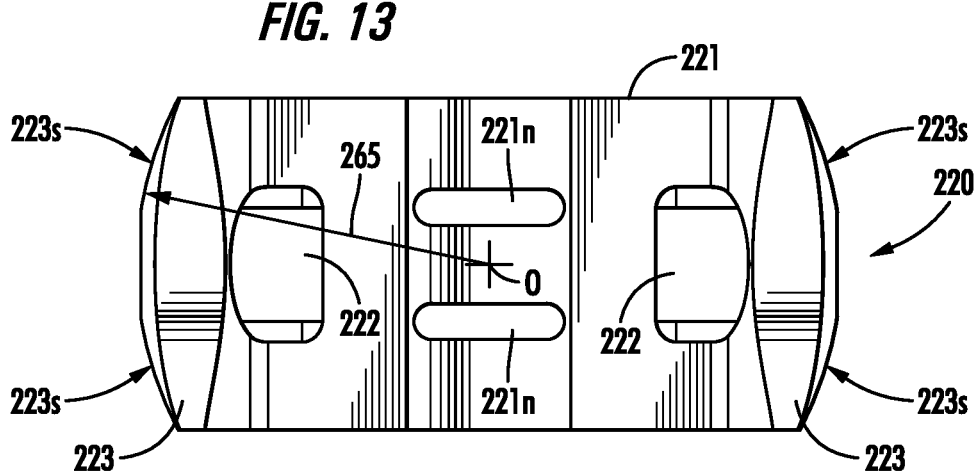
FIG. 13 is a top-down view of the illustrative valve stop retainer device shown in FIG. 12.
Figure 14:
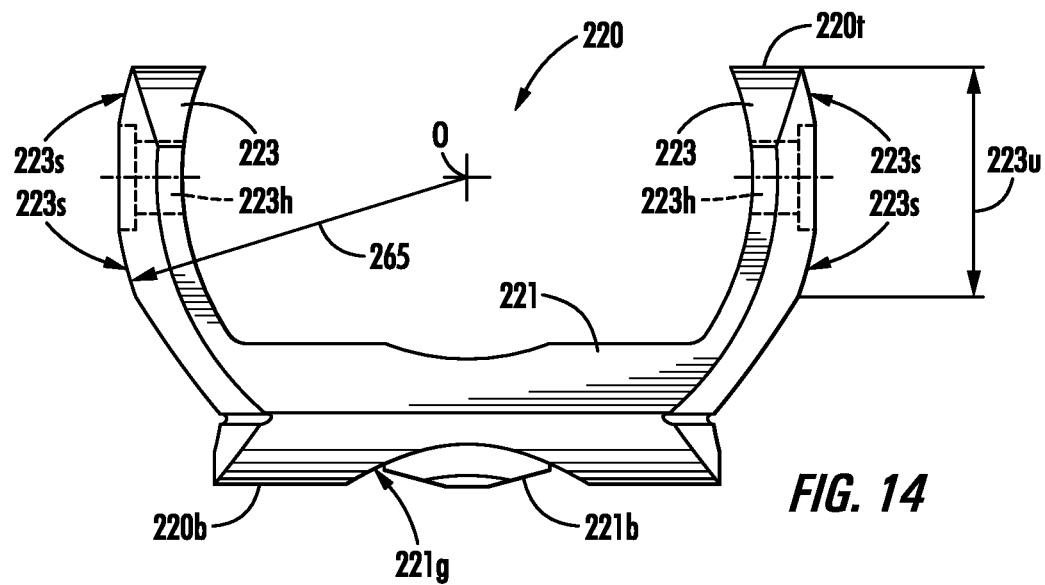
FIG. 14 is a side view of the valve stop retainer device depicted in FIG. 12.
Figure 15:
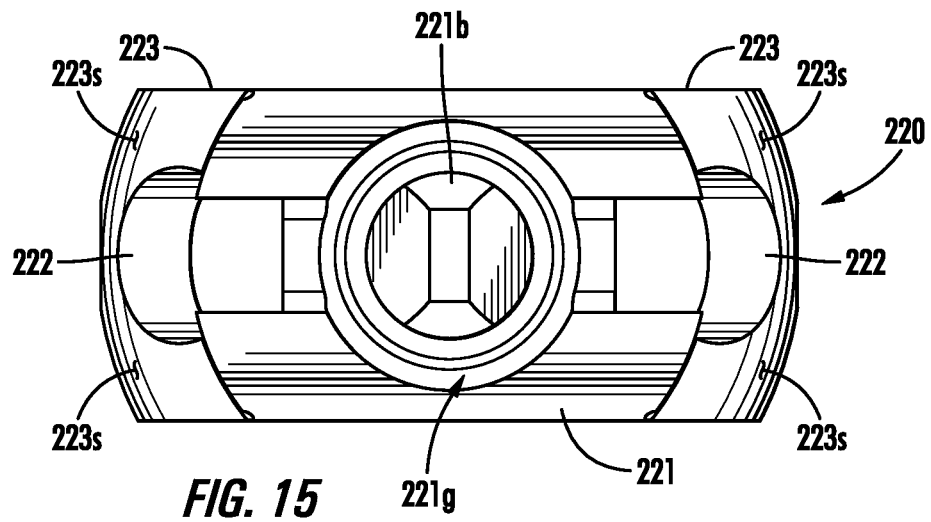
FIG. 15 is a bottom-up view of the valve stop retainer device shown in FIG. 12.

FIGS. 10 and 11 show the cross-sectional views of the pump fluid end 200 depicted in FIGS. 6 and 8, respectively, after various pump components have been installed at least in the center plunger section 270b of the pump 250. As shown in FIG. 10, a stuffing box 232 has been installed in the counterbore 219 and the plunger 202 has been installed inside of the stuffing box 232, which is adapted to provide a substantially pressure-tight dynamic seal against the outside surface of the plunger 202 as the plunger reciprocates through the plunger bore 204 during pump operation. In some embodiments, the plunger 202 includes a coupling connection 202f that is adapted to mechanical couple the plunger 202 to the power end (not shown) of the pump 250. Also as shown in FIG. 10, a side access plug 212 has been removably coupled to the pump housing 201, e.g., by removably threading the plug 212 inside of the side access opening 211, and the like. In certain embodiments, the side access plug 212 may have a boss or hub 212b that, when installed into the pump housing 201, extends inside of the access bore 214. Furthermore, a seal ring 212s may be positioned between the hub 212b and the access bore 214 so as to affect a pressure-tight seal.

As shown in FIGS. 10 and 11, a discharge valve 209 may be mounted inside of the discharge bore 210. When actuated during pump operation by an increase in fluid pressure inside of the cross-bore fluid communicating chamber 262—which is caused by the plunger 202 stroking through the plunger bore 204 toward cross-bore chamber 262—the discharge valve 209 opens so as to provide fluid communication through the discharge bore 210 and between the cross-bore chamber 262 and the discharge port 227. The fluid exiting the cross-bore chamber 262 and entering the discharge port 227 may then exit the fluid end assembly 200 by flowing through the lateral communicating bore 230c to the pump outlet 230 (see FIG. 5). As illustrated in FIGS. 10 and 11, the discharge valve 209 may be biased against a valve stop 209s by a spring 208. In certain embodiments, the valve stop 209s may be coupled to a top access plug 229, which may be removably coupled to the pump housing 201 in similar fashion to the side access plug 212, e.g., by being removably threaded into the top access opening 228. Also as with the side access plug 212, the top access plug 229 may include a boss or hub 229b that extends into the top access bore 234, and a seal ring 229s may be positioned between the hub 229b and bore 234 so as to affect a pressure-tight seal.

As previously described, a suction valve 205 may also be mounted inside of the suction bore 207. When actuated during pump operation by a decrease in fluid pressure inside of the cross-bore fluid communicating chamber 262—which is caused by the plunger 202 stroking through the plunger bore 204 away from cross-bore chamber 262—the suction valve 205 opens so as to provide fluid communication through the suction bore 207 and between a fluid inlet (not shown) of the pump fluid end 200 and the suction port 217. The fluid entering the suction port 217 may then flow into the cross-bore chamber 262 through the communicating chamber 218, from which it may then flow into the discharge port 227 in the manner previously described. As illustrated in FIGS. 10 and 11, the suction valve 205 may be biased against a valve stop retainer device 220 by a spring 208. In at least some exemplary embodiments, the valve stop retainer device 220 is adapted to be installed into the cross-bore fluid communicating chamber 262, where it may act as both a valve stop for the suction valve 205 and as a retainer device that maintains the suction valve 205 in position inside of the suction bore 207. Moreover, in certain embodiments, the valve stop retainer device 220 may be configured such that at least some surfaces of the device 220, such as the surfaces 223s shown in FIGS. 12-17, substantially conform to the shape of the boundary 260 that defines the cross-bore fluid communicating chamber 262, as will be further described below.

FIGS. 12-17 illustrate various isometric, top, side, bottom, end, and section views of an exemplary valve stop retainer device in accordance with the present disclosure such as, for example, the valve stop retainer device 220 depicted in FIGS. 10 and 11. As shown in FIGS. 12-17, the valve stop retainer device 220 may have a bottom spring retainer plate 221 and a pair of diametrically opposed retainer lobes 223, wherein each retainer lobe protrudes or extends away from a first side the spring retainer plate 221 at each end thereof (e.g., in a substantially upward direction from the top side of the retainer plate 221 in the views depicted in FIGS. 12-17). Depending on the various design and/or operation parameters of the pump 250, such as the pump flow rate, fluid viscosity, and the like, the valve stop retainer device 220 may include a fluid flow passage 222 positioned substantially at the junction of the each retainer lobe 223 to the bottom spring retainer plate 221. The fluid flow passages 222 may be adapted to allow the fluid flowing from the discharge port 217 to pass around the valve stop retainer device 220 and into the cross-bore fluid communicating chamber 262 with a lower overall drag and/or pressure drop.

In certain embodiments, a substantially centrally positioned groove 221g may be located on the opposite side of the spring retainer plate 221 from the retainer lobes 223 (e.g., on the bottom side of the retainer plate 221 in the views shown in FIGS. 12-17). The groove 221g may define a substantially centrally positioned boss or hub 221b (see e.g., FIGS. 12, 14, 15, and 17) that protrudes or extends away from a second (bottom) side of the spring retainer plate 221 (e.g., in a substantially downward direction in the views depicted in FIGS. 12-17). The boss 221b may be adapted to engage with and retain a suction valve biasing spring, such as the spring 208 that is adapted to bias the suction valve 205 (see, FIGS. 10 and 11) during the operation of the pump 250. Furthermore, one or both of the retainer lobes 223 may include a pin hole 223h that is sized to receive a locking pin 220p (not shown; see FIGS. 11 and 22). The locking pin 220p is adapted to substantially prevent the valve stop retainer device 220 from rotating out of position during pump operation and thus acts as a valve stop retainer anti-rotation device, as will be further described below. Additionally, in certain embodiments, one or more notches 221n may be formed in the upper surface of the spring retainer plate 221, which may be used to facilitate the installation of the valve stop retainer device 220 into the cross-bore fluid communicating chamber 262 (as well as its removal therefrom), as will be further described with respect to FIGS. 18-22 below.

In some embodiments, the retainer lobes 223 of the valve stop retainer device 220 may be configured such that at least an upper portion 223u of the outer surface 223s of each retainer lobe 223 has a curved shape that substantially conforms to the curvature of the inside surface 261 of the cross-bore fluid communicating chamber 262. In this way, the substantially conforming curved shape of the outer surfaces 223s on the upper portions 223u of the retainer lobes 223 may be adapted to permit the valve stop retainer device 220 to be installed into the pump fluid end 200 in the manner further described in conjunction with FIGS. 18-22 below. Furthermore, due to the substantially conforming shape of the surfaces 223s, the retainer lobes 223 may also be adapted to come into bearing contact with the inside surface 261 of the cross-bore chamber 262 along at least the upper portion 223u of each lobe 223 when the valve stop retainer device 220 is installed as described. Moreover, since the origin O of the substantially conforming curved shape that is used to define the surfaces 223s is positioned between the retainer lobes 223, below the top 220t of the valve stop retainer device 220, and above the bottom 220b of the device 220 (see, FIGS. 13, 14, and 17; see also, FIG. 11), the surfaces 223s on the upper portions 223u of the retainer lobes 223 may extend along the curved surface 261 of the cross-bore chamber 262 both above and below the origin O. Therefore, the valve stop retainer device 220 may essentially be "captured" inside of the cross-bore chamber 262 once it has been installed as described below, due to the substantially enclosing shape of the boundary 260 (and surface 261) that defines the cross-bore fluid communicating chamber 262. In the installed position, the conforming (and enclosing) shape of the cross-bore chamber 262 may thus act to substantially prevent the valve stop retainer device 220 from moving either up or down within the cross-bore chamber 262.

When used in conjunction with the cross-bore fluid communicating chamber 262 configured in accordance with the present disclosure, the valve stop retainer device 220 may therefore act to retain the suction valve 205 (not shown; see FIGS. 10, 11, and 18-22) in place during pump operation. Furthermore, as described above, the valve stop retainer device 220 may be maintained substantially in place within the cross-bore fluid communicating chamber 262 without having to rely on the use of the typical prior art retainer elements, such as flanged lips, tabs, protrusions, grooves, and/or notches, and the like. In this way, it is possible to substantially reduce, or even eliminate, at least some of the detrimental fatigue cracking effects that are often associated with the additional high stress concentration areas surrounding such prior art retainer elements, such as the corners 115c and edges 118e of the protrusions 115 shown in FIGS. 1 and 4 and described above.

In describing above that the curved shape of the outer surface 223s on the upper portion 223u of each retainer lobe 223 "substantially conforms" to the curvature of the inside surface 261 of the cross-bore fluid communicating chamber 262, it should be understood that the surfaces 223s and the surface 261 may both be configured so as to substantially conform to the shape of the same three-dimensional shape (e.g., an ellipsoid of revolution or surface of revolution, etc.) having the boundary 260. However, as would be appreciated by those of ordinary skill after a complete reading of the present disclosure, an appropriately sized gap 261g (see, FIG. 11A) should be present between the surfaces 223s and 261 so that there is sufficient clearance therebetween to allow the valve stop retainer device 220 to be removably installed into the cross-bore fluid communicating chamber 262 (as is described with respect to FIGS. 18-22 below) while still allowing the outer surfaces 223s of the retainer lobes 223 to come into sufficient bearing contact with the surface 261 of the cross-bore chamber 262 so as to keep the device 220 in position during pump operation, as noted above. Accordingly, while the respective shapes of the surfaces 223s and 261 may substantially conform to the boundary 260 of same three-dimensional shape, the equations used to generate the respective surfaces 223s and 261 may therefore be adjusted as is appropriate so as to allow for the appropriately sized predetermined gap 261g therebetween.

For example, in those embodiments wherein the three-dimensional shape having a boundary 260 is defined by an ellipsoid of revolution having semi-principal axes a, b, and c, respectively, then the semi-principal axes used in Equation 1 above to generate the inside surface 261 of the cross-bore fluid communication chamber 262 may be defined as follows $$a_1 = a + \frac{g}{2}$$
$$b_1 = b + \frac{g}{2}$$
$$c_1 = c + \frac{g}{2}$$

where:
$a_1$, $b_1$, and $c_1$, are the semi-principal axis lengths defining the surface 261; and g=the design gap 261g between the surface 261 and the surfaces 223s.

Similarly, the semi-principal axes used in Equation 1 to generate the outer surfaces 223s of the upper portions 223u of the retainer lobes 223 may be defined as follows:

$$a_2 = a - \frac{g}{2}$$
$$b_2 = b - \frac{g}{2}$$
$$c_2 = c - \frac{g}{2}$$

where:
$a_2$, $b_2$, and $c_2$, are the semi-principal axis lengths defining the surfaces 232s; and
g=the design gap 261g between the surface 261 and the surfaces 223s.

In those exemplary embodiments where the three-dimensional shape is a sphere and the spherical radius that is used in Equation 2 above to generate the boundary 260 is defined by r, then the radiuses that are used to generate the inside surface 261 of the cross-bore chamber 262 and the outer surfaces 223s of the upper portions 223u of the retainer lobes 223 may be defined as follows:

$$r_1 = r + \frac{g}{2}$$
$$r_2 = r - \frac{g}{2}$$

where:
$r_1$ is the radius of the sphere defining the surface 261;
$r_2$ is the radius of the sphere defining the surfaces 223s; and
g=the design gap 261g between the surface 261 and the surfaces 223s.

By way of example only and not by way of limitation, in one illustrative embodiment, the inside surface 261 of the cross-bore fluid communicating chamber 262 that is machined into the housing 201 of the pump fluid end 200 may be defined by a sphere having a spherical radius 263 as shown in FIG. 7 ($r_1$ above) of approximately 108.00 mm (4.250 inches). Furthermore, a design gap 261g as shown in FIG. 11A (g above) that allows the valve stop retainer device 220 to be installed into the cross-bore chamber 262 may be approximately 0.25 mm (0.010 inches). In such an embodiment, the spherical radius shown 265 shown in FIGS. 13, 14, and 17 ($r_2$ above) that defines the outer surfaces 223s of the upper portions 223u of the retainer lobes 223 may then be approximately 107.75 mm (4.240 inches). Of course, it should be understood that the actual shape and size of the cross-bore fluid communicating chamber 262 may be different from the example described above, depending on the overall design parameters of the fluid end assembly 200, including the sizes of the various bores 204, 210, 214, and 218, any lateral and/or vertical offsets between the respective bore axes 203, 216, 213, and 206, and the like. Similarly, smaller or larger design gaps 261g may also be used as long as the appropriate clearance for retainer installation and the requisite amount of bearing contact between the surfaces 223s and 261 may be provided.

Figure 18:
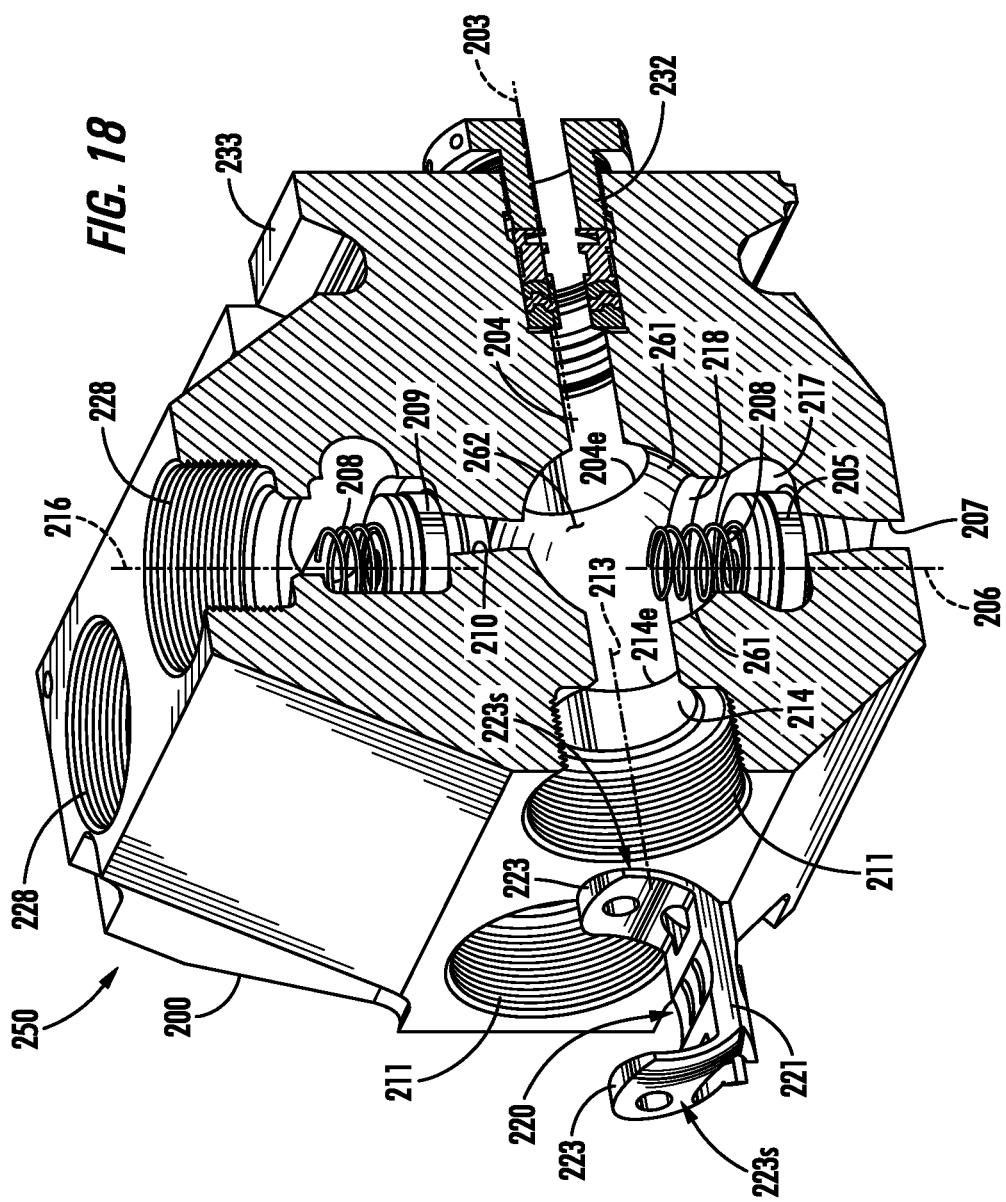
FIGS. 18-22 are various cross-sectional isometric views through the center plunger section of the illustrative pump fluid end depicted in FIG. 5 showing various steps that may be used to install an exemplary valve stop retainer device of the present disclosure into the pump fluid end in accordance with one illustrative embodiment disclosed herein.

FIGS. 18-22 are various cross-sectional isometric views through the center plunger section 270b of the illustrative fluid end assembly 200 depicted in FIG. 4, and depict at least some steps that may be used to install an exemplary valve stop retainer device of the present disclosure, such as the valve stop retainer device 220 shown in FIGS. 12-17, into the cross-bore fluid communicating chamber 262 in accordance with one embodiment of the present disclosure. Turning first to FIG. 18, the valve stop retainer device 220 has been partially inserted into the side access opening 211 and is positioned adjacent to the access bore 214 leading to the cross-bore fluid communicating chamber 262. In various embodiments, the overall height 220h (see, FIG. 17) of the valve stop retainer device 220 is less than the inside diameter of the access bore 214, and furthermore the overall shape of the device 220 when viewed from either end (see, FIG. 16) is configured such that the device 200 may be adapted to pass through the access bore 214 and into the cross-bore chamber 262.

Figure 19:
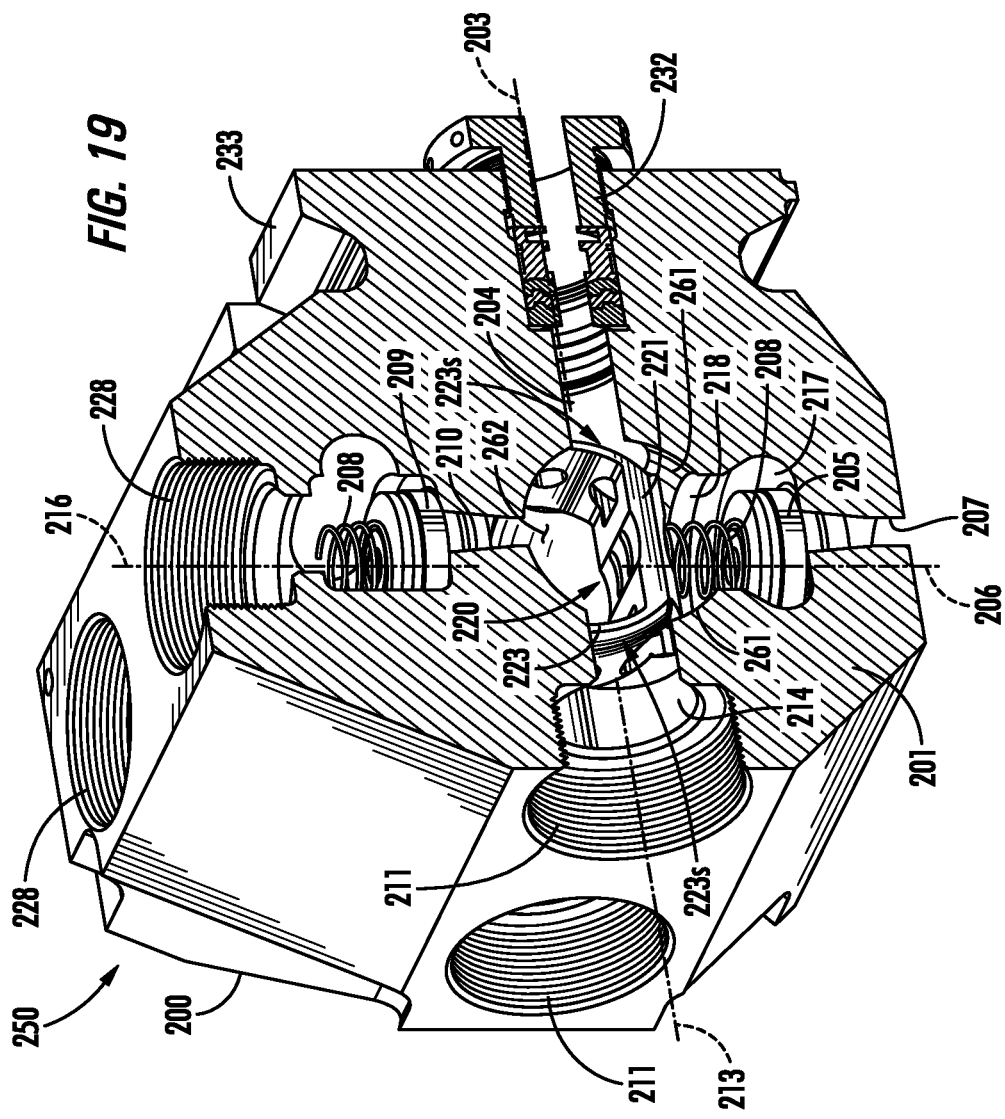

FIG. 19 illustrates the fluid end assembly 200 during a subsequent installation step, after the valve stop retainer device 220 has been inserted into the cross-bore fluid communicating chamber 262 through the access bore 214. As shown in FIG. 19, the valve stop retainer device 220 has been positioned above the suction valve 205, e.g., such that the biasing spring 208 has been mounted on the boss 221b (see, FIGS. 12, 14, 15, and 17) that is positioned on the bottom side of the spring retainer plate 221. In this way, the valve stop retainer device 220 may be substantially centered above the suction valve 205 along the suction side axis 206.

Figure 20:
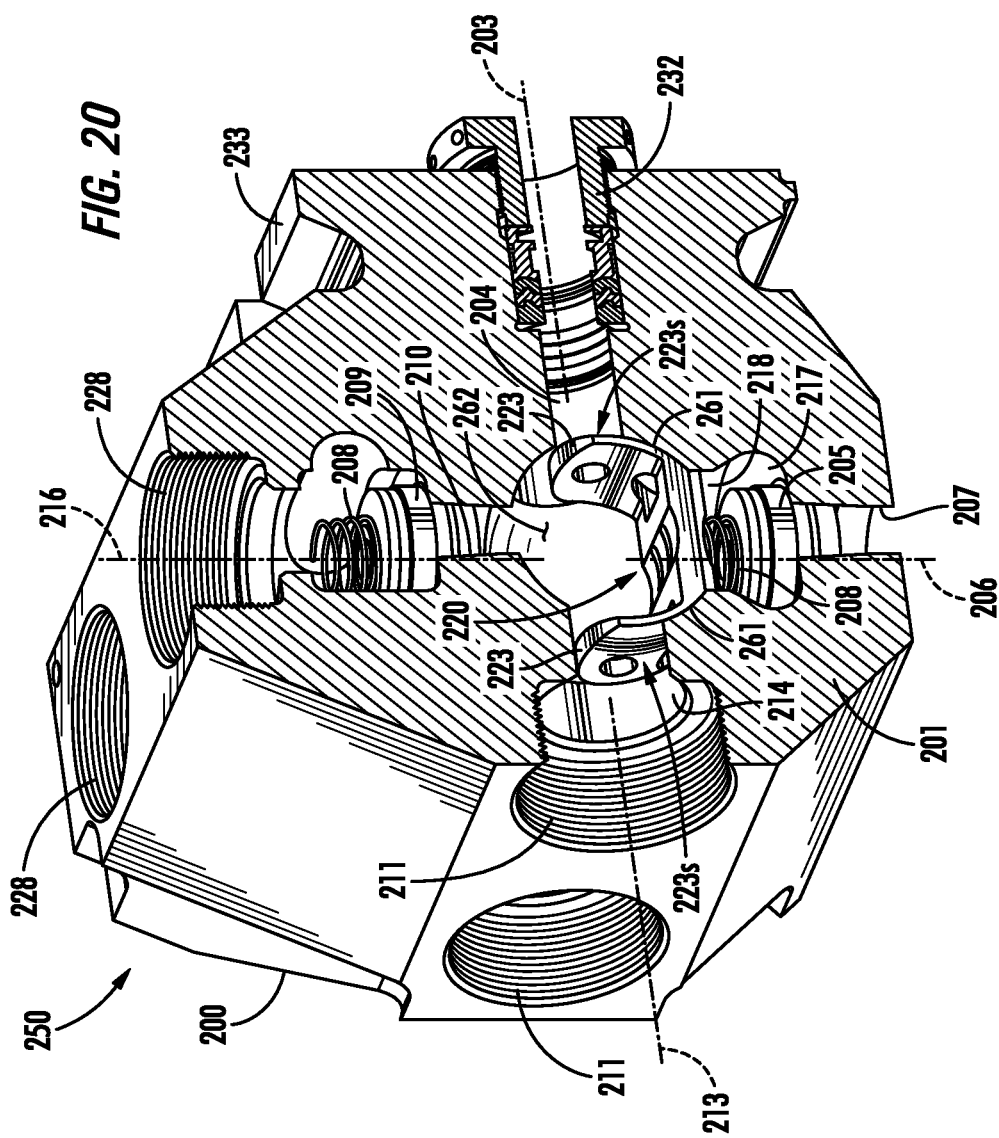

Next, as shown in FIG. 20, the valve stop retainer device 220 is pushed downward within the cross-bore fluid communicating chamber 262, thereby compressing the spring 208 on the suction valve 205. Furthermore, the valve stop retainer device 220 is pushed downward until at least the lower portions of the outer surfaces 223s are brought proximate to, or into contact with, portions of the cross-bore chamber surface 261 between the communicating chamber 218 and the plunger bore 204, and between the communicating chamber 218 and the access bore 214. As noted previously, due to the substantially conforming shapes of the curved surfaces of the valve stop retainer device 220 and the cross-bore fluid communicating chamber 262, in this position the lower portions of the surfaces 223s may be brought into substantially continuous bearing contact with the corresponding surfaces 261.

Figure 21:
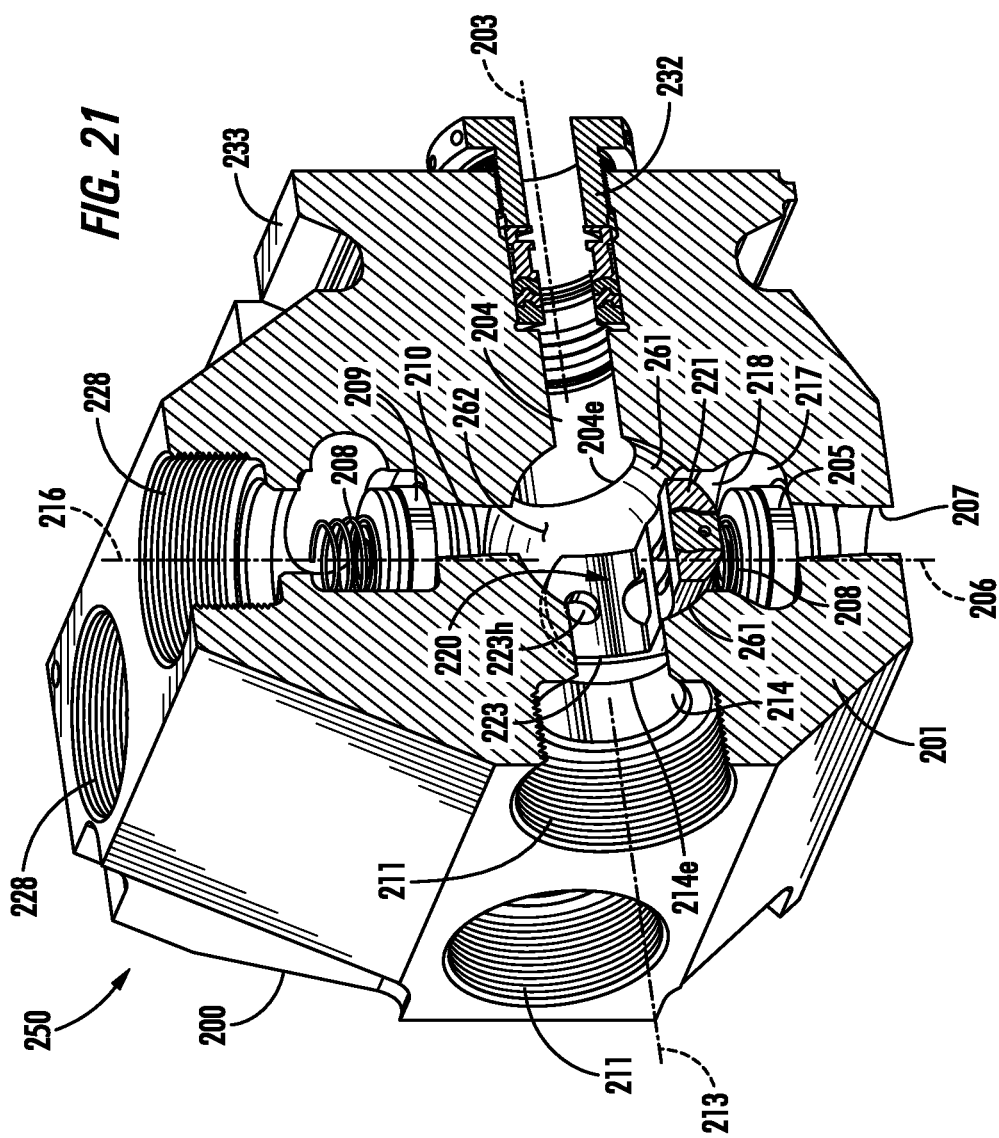

Turning now to FIG. 21, the valve stop retainer device 220 may then be rotated by one-quarter turn so that the retainer lobes 223 are moved out of the plunger axis 203. In this way, as the reciprocating plunger 202 strokes through the plunger bore 204 along the plunger axis 203 during pump operation, it will pass between the retainer lobes 223 and above the spring retainer plate 221 as it enters and exits the cross-bore fluid communication chamber 262, thus avoiding damage to the plunger 202, the valve stop retainer device 220, and/or any other internal pump elements. Furthermore, when the valve stop retainer device 220 is rotated to this transverse orientation relative to the plunger axis 203, the outer surfaces 223s of substantially the entirety of the upper portions 223u of the retainer lobes 203 may then be in substantially continuous bearing contact with the inside surface 261 of the cross-bore fluid communicating chamber 262 (see, FIG. 11). Additionally, when the valve stop retainer device 220 is in this position, the origins O of the three-dimensional shapes that are used to define both the outer surfaces 223s of the retainer lobes 223 and the inside surface 261 of the cross-bore chamber 262 may be positioned at substantially the same point within the chamber 262, with any slight variation in the origins O being due to the size of the gap 261g (see, FIG. 11A) therebetween, as previously described. Moreover, and as noted above, since the surfaces 223s of the retainer lobes 223 curve both above and below the substantially commonly positioned origins O (see, FIGS. 11, 13, 14, and 17), the corresponding surface 261 may therefore act to substantially prevent the valve stop retainer device 220 from moving either up or down relative to the cross-bore chamber 262, thus allowing the device 220 to retain the suction valve 205 in place during pump operation.

In some illustrative embodiments, a valve stop retainer installation tool (not shown) may be used to facilitate the installation and/or removal of the valve stop retainer device 220. As noted with respect to the description of FIGS. 12-17 above, one or more notches 221n may be formed in the upper surface of the spring retainer plate 221. In certain embodiments, the notches 221n may be adapted to receive an end of a corresponding shaped tool (not shown) that may then be used to push the valve stop retainer device 220 downward as shown in FIG. 20 and described above, and/or to rotate the device 220 to the transverse orientation described above and shown in FIG. 21. In at least some embodiments, the steps illustrated in FIGS. 20 and 21 may be performed through the side access opening 211 and access bore 214. In other embodiments the steps of FIGS. 20 and 21 may be performed through the top access opening 228, i.e., after removing the discharge valve 209 from the discharge bore 210 so as to provide top side access to the cross-bore fluid communicating chamber 262.

Figure 22:
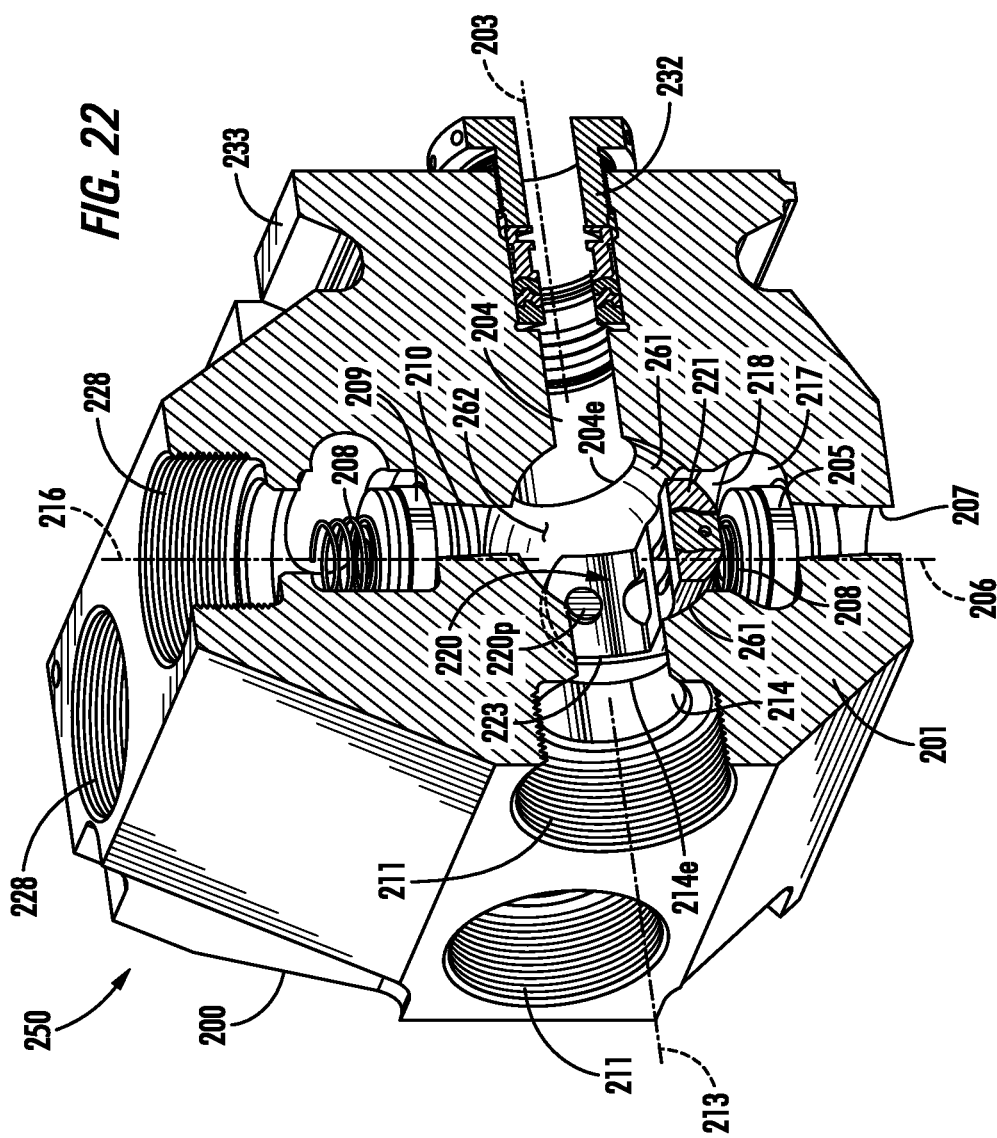

FIG. 22 illustrates a further installation step of the valve stop retainer device 220, after a locking pin 220p has been installed into the pin hole 223h. The locking pin 220p is adapted to substantially prevent the valve stop retainer device 220 from rotating during pump operation, thus keeping the device 220 in the transverse orientation depicted in FIG. 21. In this way, the retainer lobes 223 remain out of the path of the reciprocating plunger 202, thereby avoiding potential damage to the plunger 202 and/or other internal pump elements. In certain embodiments, the locking pin 220p may be a magnetic locking pin 220p, e.g., a rare earth magnet such as a neodymium magnet and the like. The use of a magnetic locking pin 220p may thus avoid having to form any additional grooves, notches, holes, threaded openings, etc., along the inside surface 261 of the cross-bore fluid communicating chamber 262, which may be necessary for other types of locking pin elements. It should be appreciated, however, that other types locking pin designs and/or materials may also be used, depending on the design objectives of the locking pin 220p.

In certain illustrative embodiments, the valve stop retainer device 220 may be removed from the cross-bore fluid communicating chamber 262 by performing the sequence of steps illustrated in FIGS. 18-22 and described above in a substantially reverse sequence.

The present disclosure therefore describes various methods, devices, and pump configurations that may be used to reduce the presence of high stress concentration areas on the inside surfaces of the fluid end of reciprocating plunger pumps, thereby lowering the susceptibility of the fluid end of the pump to detrimental fatigue crack formation. In certain embodiments, a cross-bore fluid communicating chamber is disclosed that may be used to minimize the severity of cross-bore geometry that is often found in the plunger sections of prior art reciprocating pumps. In other embodiments, a valve stop retainer device is disclosed that may be used in conjunction with the disclosed cross-bore fluid communicating chamber, wherein the valve stop retainer device is configured to have at least some surfaces that are shaped so as to substantially conform to the shape of the cross-bore chamber, thus avoiding the use of additional high stress concentration elements inside of the pump, such as notches, grooves, protrusions, and the like, to mount the valve stop retainer device.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown. It is therefore evident that the particular embodiments disclosed above may be altered or modified and all such variations are considered within the scope and spirit of the invention. Accordingly, the protection sought herein is as set forth in the claims below.

What is claimed:

1. A valve stop retainer device that is adapted to interface with a cross-bore fluid communication chamber of a reciprocating pump,-the valve stop retainer device comprising:
    a spring retainer plate; and
    a plurality of retainer lobes extending substantially away from a first side of said spring retainer plate, each of said plurality of retainer lobes comprising an upper portion having an outer surface, wherein a shape of each of said outer surfaces and a shape of an inside surface of said cross-bore fluid communication chamber interfacing with said valve stop retainer device substantially conform to a shape of at least a portion of a surface of revolution that is developed by rotating a curved line about a coplanar axis of revolution, said valve stop retainer device being adapted to be retained inside of said cross-bore fluid communication chamber by said shape of said inside surface.

2. The valve stop retainer device of claim 1, wherein said spring retainer plate comprises first and second ends and said plurality of retainer lobes comprises first and second retainer lobes extending substantially away from said respective first and second ends of said spring retainer plate.

3. The valve stop retainer device of claim 1, further comprising a boss extending substantially away from a second side of said spring retainer plate that is opposite of said first side, said boss being adapted to engage with and retain a biasing spring of a suction valve of said reciprocating pump.

4. The valve stop retainer device of claim 1, wherein said valve stop retainer device is adapted to retain a suction valve in a suction side bore of said reciprocating pump.

5. The valve stop retainer device of claim 1, wherein said surface of revolution is an ellipsoid of revolution, an origin of said ellipsoid of revolution being positioned between said plurality of retainer lobes, above a bottom of said valve stop retainer device, and below a top of said valve stop retainer device.

6. The valve stop retainer device of claim 5, wherein said ellipsoid of revolution is a sphere.

7. The valve stop retainer device of claim 1, wherein said valve stop retainer device is adapted to be rotated inside of said cross-bore fluid communication chamber about said axis of revolution of said surface of revolution from a first position to a second position.

8. The valve stop retainer device of claim 7, wherein said second position is adapted to allow a plunger reciprocating inside of a plunger bore of said reciprocating pump to extend between said plurality of retainer lobes during operation of said reciprocating pump.

9. A fluid end assembly of a reciprocating pump, the fluid end assembly comprising:
    a pump housing;
    a cross-bore fluid communication chamber positioned in said pump housing, said cross-bore fluid communication chamber having an inside surface, a shape of said inside surface substantially conforming to a shape of a boundary defined by a surface of revolution that is developed by rotating a curved line about a coplanar axis of revolution;
    a suction bore positioned in said pump housing;
    a suction valve positioned in said suction bore; and
    a valve stop retainer device positioned in said cross-bore fluid communication chamber and comprising a plurality of retainer lobes having outer surface portions, wherein said valve stop retainer device is adapted to be rotated about said axis of revolution while positioned inside of said cross-bore fluid communication chamber and to retain said suction valve in said suction bore during operation of said reciprocating pump, a shape of each of said outer surface portions substantially conforming to said shape of said boundary of said surface of revolution.

10. The fluid end assembly of claim 9, further comprising:
    a plunger bore positioned in said pump housing, said plunger bore intersecting said cross-bore fluid communication chamber; and
    a plunger that is adapted to be reciprocated inside of said plunger bore, wherein said valve stop retainer device is adapted to be rotated inside of said cross-bore fluid communication chamber to an operating orientation that allows said plunger to extend between said plurality of retainer lobes during operation of said reciprocating pump.

11. The fluid end assembly of claim 9, wherein said surface of revolution is an ellipsoid of revolution, an origin of said ellipsoid of revolution being positioned between said plurality of retainer lobes, above a bottom of said valve stop retainer device, and below a top of said valve stop retainer device.

12. The fluid end assembly of claim 11, wherein said ellipsoid of revolution is a sphere.

13. The fluid end assembly of claim 9, further comprising at least one locking pin that is adapted to prevent said valve stop retainer device from rotating inside of said cross-bore fluid communication chamber.

14. The fluid end assembly of claim 13, wherein said at least one locking pin comprises a magnet.

15. The fluid end assembly of claim 9, wherein substantially an entirety of said outer surface portions of said plurality of retainer lobes is adapted to contact said inside surface of said cross-bore fluid communication chamber.

16. The fluid end assembly of claim 9, wherein said inside surface is defined by a first ellipsoid of revolution and said outer surface portions are defined by a second ellipsoid of revolution, a length of each of said semi-principal axes of said second ellipsoid of revolution being less than a length of a corresponding semi-principal axis of said first ellipsoid of revolution by a predetermined gap distance.

17. The fluid end assembly of claim 16, wherein said predetermined gap distance is approximately 0.25 mm or less.

18. The fluid end assembly of claim 9, further comprising a suction port positioned in said pump housing, said suction port intersecting said cross-bore fluid communication chamber, wherein said suction valve is adapted to control a flow of fluid from said suction bore into said suction port and said suction port is adapted to provide fluid communication between said suction bore and said cross-bore fluid communication chamber.

19. The fluid end assembly of claim 9, further comprising:
a discharge bore positioned in said pump housing;
a discharge valve positioned in said discharge bore; and
a discharge port positioned in said pump housing, wherein said discharge valve is adapted to control a flow of fluid from said discharge bore into said discharge port and said discharge bore is adapted to provide fluid communication between said cross-bore fluid communication chamber and said discharge port.

20. The fluid end assembly of claim 9, further comprising at least one access opening positioned in said pump housing and intersecting said cross-bore fluid communication chamber, wherein said valve stop retainer device is adapted to be installed into said cross-bore fluid communication chamber through said at least one access opening.

\* \* \* \* \*